(12) United States Patent
Chang et al.

(10) Patent No.: US 10,878,769 B2
(45) Date of Patent: Dec. 29, 2020

(54) ANTI-GLARE DISPLAY SYSTEM

(71) Applicant: ABILITY OPTO-ELECTRONICS TECHNOLOGY CO.LTD., Taichung (TW)

(72) Inventors: Yeong-Ming Chang, Taichung (TW); Chien-Hsun Lai, Taichung (TW); Yi-Chi Cheng, Taichung (TW); Shou-Chih Cheng, Taichung (TW); Tzu-Hsuan Wei, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 16/511,965

(22) Filed: Jul. 15, 2019

(65) Prior Publication Data

US 2020/0111440 A1 Apr. 9, 2020

Related U.S. Application Data

(60) Provisional application No. 62/743,152, filed on Oct. 9, 2018.

(51) Int. Cl.
| | |
|---|---|
| *G09G 3/38* | (2006.01) |
| *G02F 1/163* | (2006.01) |
| *H04N 7/18* | (2006.01) |
| *H04N 5/225* | (2006.01) |
| *G06F 3/14* | (2006.01) |

(Continued)

(52) U.S. Cl.
CPC .................. *G09G 3/38* (2013.01); *B60R 1/00* (2013.01); *B60R 1/088* (2013.01); *B60R 1/12* (2013.01); *G02F 1/163* (2013.01); *G06F 3/1423* (2013.01); *H04N 5/2254* (2013.01); *H04N 7/183* (2013.01); *B60R 2001/1215* (2013.01); *B60R 2300/20* (2013.01); *B60R 2300/30* (2013.01); *B60R 2300/8066* (2013.01);

(Continued)

(58) Field of Classification Search
CPC ............. G09G 3/38; G09G 2320/0242; G09G 2360/144; G09G 2380/10; B60R 1/00; B60R 1/088; B60R 1/12; B60R 2001/1215; B60R 2300/20; B60R 2300/30; B60R 2300/8066; G02F 1/163; G02F 3/1423; H04N 5/2254; H04N 7/183
USPC ........................................................ 348/148
See application file for complete search history.

(56) References Cited

U.S. PATENT DOCUMENTS

| | | | | |
|---|---|---|---|---|
| 2004/0032676 | A1* | 2/2004 | Drummond | G01J 1/46 359/877 |
| 2004/0202001 | A1* | 10/2004 | Roberts | B60R 1/12 362/494 |

(Continued)

*Primary Examiner* — Matthew K Kwan
(74) *Attorney, Agent, or Firm* — Wang Law Firm, Inc.

(57) ABSTRACT

An anti-glare display system is provided, including: at least one camera unit disposed on a moving device, at least disposed on a rear side of the moving device, and photographing a major image in a direction opposite to a moving direction; a processing unit electrically connected to the at least one camera unit to receive the major image and dividing the major image to obtain at least one sub-image; at least one display unit comprising an electrochromic element and electrically connected to the processing unit to receive and display the sub-image from the processing unit; and a microcontroller electrically connected to the processing unit and the at least one display unit.

10 Claims, 29 Drawing Sheets
(4 of 29 Drawing Sheet(s) Filed in Color)

(51) Int. Cl.
*B60R 1/00* (2006.01)
*B60R 1/08* (2006.01)
*B60R 1/12* (2006.01)

(52) U.S. Cl.
CPC .............. *G09G 2320/0242* (2013.01); *G09G 2360/144* (2013.01); *G09G 2380/10* (2013.01)

(56) References Cited

U.S. PATENT DOCUMENTS

| | | | | |
|---|---|---|---|---|
| 2005/0024729 | A1* | 2/2005 | Ockerse | G02B 5/0221 359/603 |
| 2011/0316828 | A1* | 12/2011 | Shirbabadi | G09G 3/20 345/207 |
| 2019/0084481 | A1* | 3/2019 | Diedrich | B60R 1/00 |

* cited by examiner (a)

(b)

ANTI-GLARE DISPLAY SYSTEM

CROSS-REFERENCE TO RELATED APPLICATION

This application claims priority to and the benefit of, pursuant to 35 U.S.C. § 119, U.S. provisional patent application Ser. No. 62/743,152 filed on Oct. 9, 2018, the disclosure of which is incorporated herein in its entirety by reference.

BACKGROUND OF THE INVENTION

1. Field of the Invention

The present invention relates to an anti-glare display system, more particularly to an anti-glare display system which includes an electrochromic element capable of adjusting the degree of discoloration.

2. Description of the Related Art

With the advancement of technology in transportation, a variety of types of transportation have greatly developed. Using moving devices such as automobiles to transport crews or goods is particularly the main way of transportation.

For a user driving an automobile, when going in or out of a tunnel, the user cannot clearly see images in rear-view mirrors due to headlights from automobiles behind and passengers using electronic devices in back seats, which both cause intense light beaming on the rear-view mirrors, further leading to a glare phenomenon on the rear-view mirrors. Driving safety issues may thus occur.

Currently, electronic rear-view mirrors are often used to replace conventional rear-view mirrors to overcome the glare phenomenon. However, the electronic rear-view mirrors on the market have the limitation of simultaneous operation for the left rear-view mirror, the middle rear-view mirror, and the right rear-view mirrors. This means that the three rear-view mirrors would simultaneously adjust the brightness of the displayed image. The phenomenon of a black field of view may be generated on the rear-view mirror which is not exposed to glare, or only a few rear-view mirrors are beamed by the glare, which is not enough to activate the anti-glare function of the three mirrors at the same time.

Therefore, there is still a need for an anti-glare display system capable of adjusting the level of anti-glare of the left rear-view mirror, the middle rear-view mirror, and the right rear-view mirror individually.

SUMMARY OF THE INVENTION

According to the aforementioned problem, the present invention aims to provide an anti-glare display system for replacing a light sensor with a camera unit. In an attempt to solve the problem caused by the prior art, the degree of discoloration of the electrochromic element may be respectively adjusted according to a glare value calculated from an image taken by the camera unit.

According to the purpose of the present invention, the present invention provides an anti-glare display system, including: at least one camera unit disposed on a moving device, at least disposed on a rear side of the moving device, and photographing a major image in a direction opposite to a moving direction; a processing unit electrically connected to the at least one camera unit to receive the major image and dividing the major image to obtain at least one sub-image; at least one display unit comprising an electrochromic element and electrically connected to the processing unit to receive and display the sub-image from the processing unit; and a microcontroller electrically connected to the processing unit and the at least one display unit; wherein when the processing unit determines that a glare value of the sub-image is larger than a threshold value, the processing unit controls the microcontroller to adjust the electrochromic element of the display unit displaying the sub-image with the glare value being greater than the threshold value so as to adjust a degree of discoloration of the electrochromic element.

Preferably, the processing unit determines ambient light intensity by the major image and determines glare light source intensity by the sub-image, and the glare value is a ratio of the glare light source intensity and the ambient light intensity.

Preferably, the display unit further includes: a transflective layer disposed between a transparent substrate of the electrochromic element and a transparent conductive layer to be used as a transflective mirror.

Preferably, the transflective layer has a transmittance between 1% and 99.

Preferably, the transflective layer has a reflectance between 1% and 99%.

Preferably, the display unit further includes: a planar display device disposed in front of the transflective mirror along the moving direction and displaying the sub-image; wherein the transflective mirror closely attaches the planar display device.

Preferably, the camera unit has a horizontal field of view at least larger than 45 degrees.

Preferably, the camera unit has a horizontal field of view between 45 degrees and 230 degrees.

Preferably, the processing unit calibrates the glare value with a calibration value, and the calibration value corresponds to a physiological reference value of a user of the moving device.

Preferably, the camera unit further includes: an image sensor component receiving a light in the moving direction; and a lens assembly positioned in the moving direction of the light and in front of the optical image sensor, and an optical axis of the lens assembly overlapping a central normal line of a sensing surface of the optical image sensor in such a way that the light focuses on the optical image sensor.

Preferably, an electro-optical switch is positioned in front of the lens assembly in the moving direction of the light, and the electro-optical switch changes a transmittance thereof according to a control signal to obstruct a travel route of the light or to make the light pass through the electro-optical switch; and a micro-control component is electrically connected to the electro-optical switch.

Preferably, the micro-control component sends the control signal to the electro-optical switch according to a command of the processing unit.

Preferably, the micro-control component sends the control signal having a first voltage to the electro-optical switch according to the command of the processing unit, and the electro-optical switch decreases a transmittance thereof to obstruct the travel route of the light.

Preferably, the micro-control component sends the control signal having a second voltage to the electro-optical switch according to the command of the processing unit, and the electro-optical switch increases a transmittance thereof to enable the light to pass through the electro-optical switch.

Preferably, the lens assembly includes five, six, seven, eight, nine, or ten lenses having refractive power, and each of the lenses is arranged sequentially from an object side to an image side; the lens assembly satisfies the following condition: $0.1 \leq \text{InTL}/\text{HOS} \leq 0.95$; wherein, HOS is a distance from an object side surface of a lens farthest from an image plane to a sensing surface of the optical image sensor on an optical axis; InTL is a distance from an object side surface of a lens furthest from the image plane to a lens closest to the image plane on an optical axis.

According to the other purpose, the present invention provides an anti-glare display system, including: at least one camera unit disposed on a moving device, at least disposed on a rear side of the moving device, and photographing a major image in a direction opposite to a moving direction; a processing unit electrically connected to the at least one camera unit to receive the major image and dividing the major image to obtain at least three sub-images; at least three display units, each of the display units comprising an electrochromic element and electrically connected to the processing unit; and a microcontroller electrically connected to the processing unit and the at least three display units; wherein the processing unit controls the microcontroller respectively according to a glare value of each of the sub-images to enable the microcontroller to respectively adjust each of the electrochromic elements corresponding to each of the display units which displays each of the sub-images so as to adjust a degree of discoloration of each of the electrochromic elements.

Preferably, the processing unit determines ambient light intensity by the major image and determines glare light source intensity by each of the sub-images, and the glare value is a ratio of the glare light source intensity and the ambient light intensity.

Preferably, each of the display units further includes: a transflective layer disposed on a transparent substrate of the electrochromic element to be used as a transflective mirror.

Preferably, each of the display units further includes: a transflective layer disposed between a transparent substrate of the electrochromic element and a transparent conductive layer to be used as a transflective mirror.

Preferably, the transflective layer has a reflectance between 1% and 99%.

Preferably, the transflective layer has a reflectance between 5% and 99%.

Preferably, the at least one display unit further includes: a planar display device disposed in front of the transflective mirror along the moving direction and displaying the sub-image; wherein the transflective mirror closely attaches the planar display device.

Preferably, the camera unit has a horizontal field of view at least larger than 45 degrees.

Preferably, the camera unit has a horizontal field of view between 45 degrees and 230 degrees.

Preferably, the processing unit calibrates the glare value with a calibration value, and the calibration value corresponds to a physiological reference value of a user of the moving device.

Preferably, the camera unit further includes: an image sensor component receiving a light in the moving direction; and a lens assembly positioned in the moving direction of the light and in front of the optical image sensor, and an optical axis of the lens assembly overlapping a central normal line of a sensing surface of the optical image sensor in such a way that the light focuses on the optical image sensor.

Preferably, an electro-optical switch is positioned in front of the lens assembly in the moving direction of the light, and the electro-optical switch changes a transmittance thereof according to a control signal to obstruct a travel route of the light or to make the light pass through the electro-optical switch; and a micro-control component is electrically connected to the electro-optical switch.

Preferably, the micro-control component sends the control signal to the electro-optical switch according to a command of the processing unit.

Preferably, the micro-control component sends the control signal having a first voltage to the electro-optical switch according to the command of the processing unit, and the electro-optical switch decreases a transmittance thereof to obstruct the travel route of the light.

Preferably, the micro-control component sends the control signal having a second voltage to the electro-optical switch according to the command of the processing unit, and the electro-optical switch increases a transmittance thereof to enable the light to pass through the electro-optical switch.

Preferably, the lens assembly comprises five, six, seven, eight, nine, or ten lenses having refractive power, and each of the lenses is arranged sequentially from an object side to an image side; the lens assembly satisfies the following condition: $0.1 \leq \text{InTL}/\text{HOS} \leq 0.95$; wherein, HOS is a distance from an object side surface of a lens farthest from an image plane to a sensing surface of the optical image sensor on an optical axis; InTL is a distance from an object side surface of a lens furthest from the image plane to a lens closest to the image plane on an optical axis.

According to another purpose, the present invention provides an image-capturing system including the aforementioned anti-glare display system, wherein the image-capturing system is applied to an electronic portable device, an electronic wearable device, an electronic monitoring device, an electronic information device, an electronic communication device, a machine vision device, or a vehicle electronic device.

The anti-glare display system of the present invention has the following advantages:

(1) The anti-glare display system of the present invention has the ability to control the degree of discoloration of the electrochromic element respectively, thus avoiding the necessity of conventional electronic rear-view mirrors simultaneously adjusting the brightness of the three rear-view mirrors. For instance, the anti-glare display system of the present invention may overcome a sudden change of light when entering and leaving a tunnel, the phenomenon of black field of view generated on the rear-view mirror which is not exposed to glare, or only a few rear-view mirrors being beamed by the glare, which is not enough to activate the anti-glare function of the three mirrors at the same time.

(2) The anti-glare display system of the present invention replaces the conventional ambient light sensor with a camera unit to calculate a glare value. Thus, in the major image obtained from the camera unit, an region of interest (ROI) may be selected according to requirements. The region of interest may then be divided into sub-images. The glare value is calculated for the sub-image only. This means that the anti-glare display system of the present invention is able to determine whether the glare value is larger than a default threshold value for the activation of the electrochromic element. Moreover, the system is able to calculate corresponding glare value for different sub-images of the region of interest to control the corresponding electrochromic element to perform different degrees of discoloration.

(3) In addition to using the camera unit to replace the conventional ambient light sensor for the calculation of the glare value, the anti-glare display system of the present invention is able to further simplify the way of calculating the glare value, thus achieving the effect of instant feedback. Specifically, the major image captured by the camera unit of the present invention is compressed into a low-resolution image, and the low-resolution image is then divided in a mesh array method for the selection of the region of interest. The simplified value in the region of interest, also known as the value of the sub-image, is then calculated, thus largely reducing the time required for the calculation of the glare value and still maintaining the accuracy of the calculated glare value.

(4) The anti-glare display system of the present invention may additionally be provided with an ambient light sensor, thus simultaneously referring to the glare value calculated by the camera unit and the glare value calculated by ambient light sensor. For instance, performing a method, such as averaging the glare values calculated by this two elements, is done to precisely achieve the purpose of calculating the glare value, or ambient light in front and rear views are calculated more precisely when an automobile enters or leaving a tunnel. In addition, having the camera unit and the ambient light sensor at the same time may lower the possibility of a breakdown of the device which may cause a malfunction of the anti-glare display system as a whole.

(5) The anti-glare display system of the present invention correspondingly adjust the degree of discoloration of the electrochromic element in each display unit according to various parameters, such a user's physiological parameters, an external environment, and an image taken by the camera unit. For instance, the anti-glare display system of the present invention may adjust a calibration value for correcting the glare value according to physiological parameters, such as a user's height, body length, leg length, and eye height. Therefore, provided that the height of a user driving an automobile is shorter than that of a user, the calibration value may be adjusted by the input of the height as a physiological parameter. Hence, the anti-glare display system of the present invention may be widely applied to all users.

(6) The display unit of the anti-glare display system of the present invention includes a transflective mirror. Therefore, if any electronic component in the the anti-glare display system of the present invention malfunctions, a function as a rear-view mirror may still be achieved by using transflective mirror disposed in the display unit. Therefore, the safety of using the anti-glare display system of the present invention may be enhanced.

BRIEF DESCRIPTION OF THE DRAWINGS

The patent or application file contains at least one drawing executed in color. Copies of this patent and/or patent application publication with color drawing(s) have been provided to the Office upon request and payment of the necessary fee has been submitted.

DESCRIPTION OF THE PREFERRED EMBODIMENTS

Figure 1:
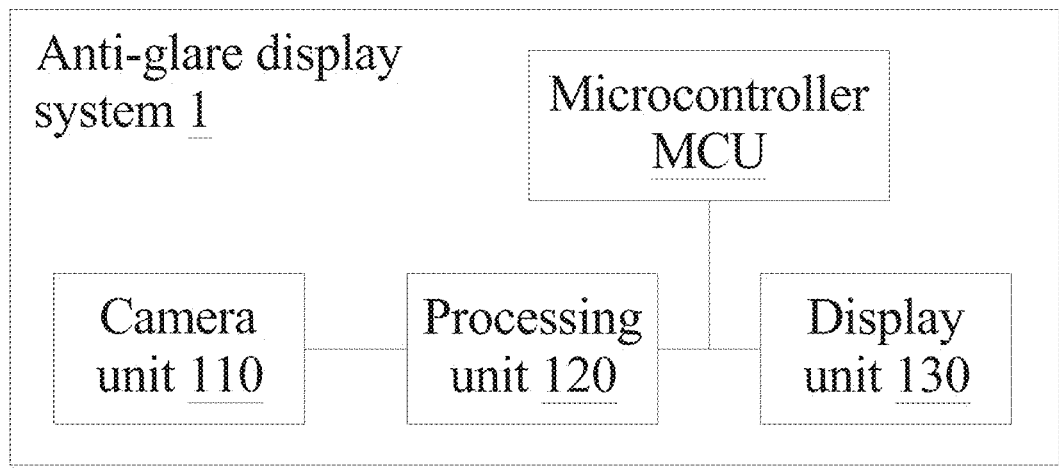
FIG. 1 depicts a block diagram of the anti-glare display system of the present invention.

To make the aforementioned purpose, the technical features, and the gains after actual implementation more obvious and understandable to a person of ordinary skill in the art, the following description shall be explained in more detail with reference to the preferable embodiments together with related drawings. In addition, for ease of understanding and description, the size and thickness of the constituent elements in the drawings shall be arbitrarily presented; however, the present invention is not limited herein. For ease of understanding, the same elements in the following embodiments are explained in accordance with the same symbols.

FIG. 1 depicts a block diagram of the anti-glare display system of the present invention. As shown, the anti-glare display system 1 of the present invention includes at least one camera unit 110, a processing unit 120, at least one display unit 130, and a microcontroller MCU.

The at least one camera unit 110 is disposed on a moving device, is at least disposed on a rear side of the moving device, and photographs a major image in a direction opposite to a moving direction.

The processing unit 120 is electrically connected to the at least one camera unit 110 to receive the major image Pm and dividing the major image Pm to obtain at least one sub-image Pn. Wherein, the camera unit 110 has a horizontal field of view H-FOV at least larger than 45 degrees; or the camera unit 110 has a horizontal field of view H-FOV between 45 degrees and 230 degrees. In one embodiment, on the major image Pm, a particular region may be selected as a region of interest ROI. The region of interest ROI may be divided as any number of sub-images Pn, or a particular portion in the region of interest ROI may be selected as the sub-images Pn. Wherein, the region of interest ROI and the sub-image Pn may be one or more regions. Wherein, the sub-image Pn may include all or part of the region of interest ROI.

The display unit 130 includes an electrochromic element. The display unit 130 is electrically connected to the processing unit 120 to receive the sub-image Pn from the processing unit 120. The display unit 130 displays the received sub-image Pn. In one embodiment, the processing unit 130 determines ambient light intensity by the major image Pm and determines glare light source intensity by the sub-image Pn, and the glare value is a ratio of the glare light source intensity and the ambient light intensity. In one embodiment, the electrochromic element is further provided with a reflective layer as a reflective mirror along the moving direction D1 in which the transparent substrate faces the front.

The microcontroller MCU is electrically connected to the processing unit 120 and the at least one display unit 130. Wherein, when the processing unit 120 determines that a glare value of the sub-image Pn is larger than a threshold value, the processing unit 120 controls the microcontroller MCU to adjust the electrochromic element of the display unit 130 displaying the sub-image Pn with the glare value being greater than the threshold value 130 so as to adjust a degree of discoloration of the electrochromic element. In one embodiment, the greater the glare value is, the higher the degree of discoloration of the electrochromic element will be.

Figure 2:
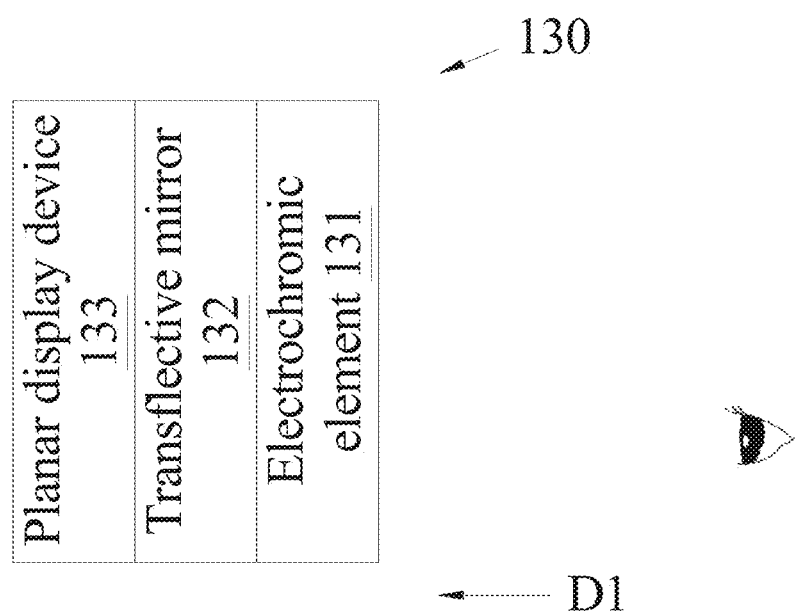
FIG. 2 depicts a schematic diagram of the display unit of the anti-glare display system of the present invention.

Please refer to FIG. 2 which depicts a schematic diagram of the display unit 130 of the anti-glare display system of the present invention. As shown, the display unit 130 includes an electrochromic element 131. In one embodiment, the display unit 130 may further include a transflective mirror 132 in addition to the electrochromic element 131. The transflective mirror 132 is disposed in front of the electrochromic element 131 along the moving direction D1. There-fore, the anti-glare display system 1 of the present invention may directly use the transflective mirror 132 as a mirror having a reflective function.

Figure 3:
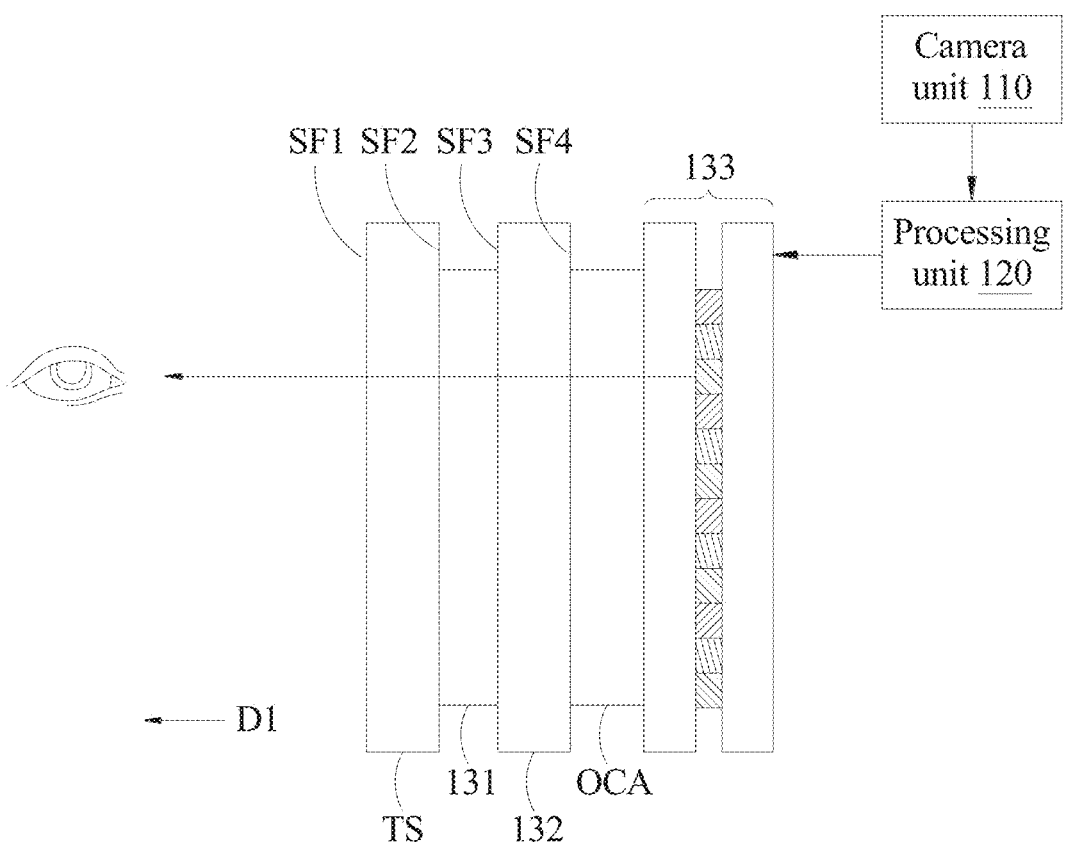
FIG. 3 depicts a schematic diagram of the display unit of the anti-glare display system according to one embodiment of the present invention.
Figure 4:
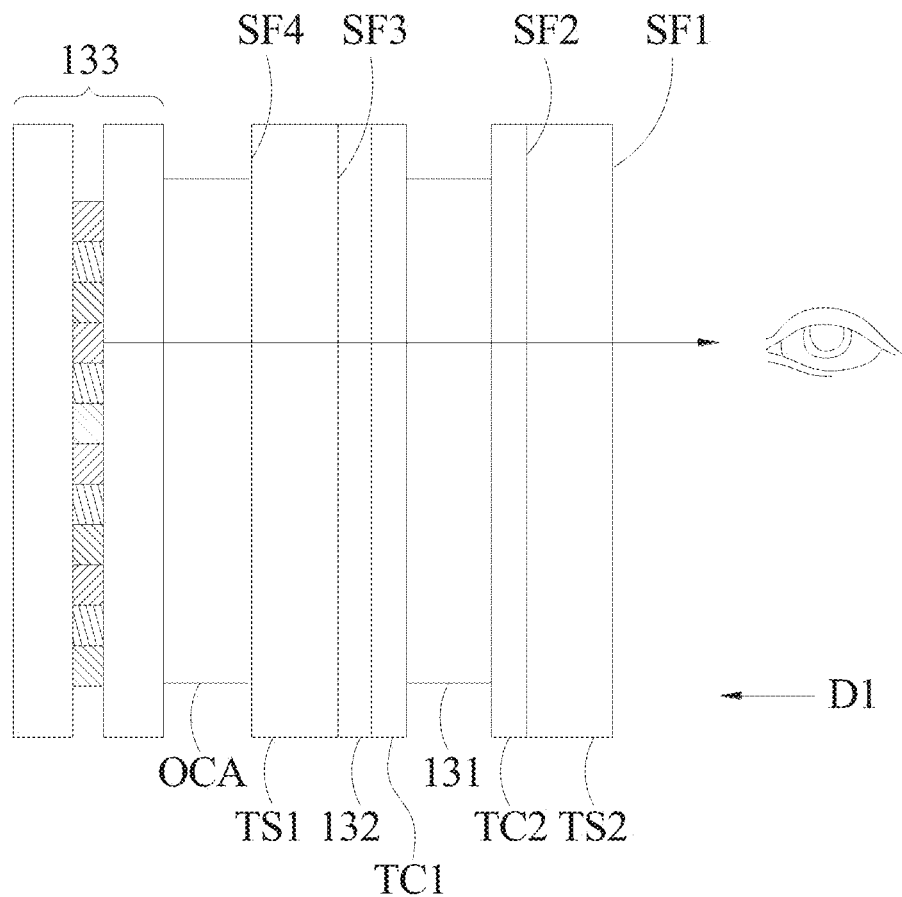
FIG. 4 depicts a schematic diagram of the display unit of the anti-glare display system according to one embodiment of the present invention.

FIGS. 3 and 4 respectively depict schematic diagrams of the display unit of the anti-glare display system according to one embodiment of the present invention.

As shown in FIG. 3, The camera unit 110 is connected to the processing unit 120 and controls the display unit 130. Wherein, a planar display device 133, a transparent optical adhesive OCA, a transflective mirror 132, an electrochromic element 131, and the transparent substrate TS are sequentially disposed along the moving direction. The fourth surface SF4 is denoted as an interface between the transparent optical adhesive OCA and the transflective mirror 132; the third surface SF3 is denoted as an interface between the transflective mirror 132 and the electrochromic element 131; the second surface SF2 is denoted as an interface between the electrochromic element 131 and the transparent substrate TS; and the first surface SF1 is denoted as another surface of the transparent substrate TS. As shown in FIG. 4, the display unit 130 may further include a first transparent substrate TS1, a second transparent substrate TS2, a first transparent conductive layer TC1, and a second transparent conductive layer TC2.

In one embodiment, the material of the electrochromic element 131 includes at least one selected from the group consisting of transition metal oxides, intervalent intercalation compounds, and organic compounds. The transition metal oxides include tungsten trioxide ($WO_3$), vanadium pentoxide ($V_2O_5$), nickel oxide ($NiO_x$), molybdenum trioxide ($MoO_3$), niobium pentaoxide ($Nb_2O_5$), titanium dioxide ($TiO_2$), or rhodium sesquioxide ($Rh_2O_3$). The intervalent intercalation compounds include $Fe_4[Fe(CN)_6]_3$, $Fe_4[Ru(CN)_6]_3$, $CoFe(CN)_6$, $KVFe(CN)_6$, or $InFe(CN)_6$. The organic compounds include pyrazooline, Poly (aniline), or Tetrathiafulvalene. Therefore, when the microcontroller MCU controls the voltage applied to the electrochromic element 131, the material in the electrochromic element 131 undergoes an oxidation-reduction reaction. Therefore, the electrochromic element 131 changes the degree of discoloration according to the magnitude of the applied voltage.

In one embodiment, the display unit 130 may further include a planar display device 133 in addition to the electrochromic element 131 and the transflective mirror 132. The planar display device 133 is disposed in front of the transflective mirror 132 along the moving direction D1. The transflective mirror 132 is disposed and only attached to the planar display device 133. The planar display device 133 may include a display device such as an LCD or an OLED.

Therefore, when a user U observes the display unit 130 along the moving direction D1 and the anti-glare display system 1 of the present invention is activated, the image observed by the user U and transmitted by the planar display device 133 passing through the transflective mirror 132 may be adjusted according to the degree of discoloration of electrochromic element 131. Conversely, when the user U observes the display unit 130 along the moving direction D1 and the anti-glare display system 1 of the present invention is deactivated, the user U may directly observe the image reflected on the transflective mirror 132.

Figure 5:
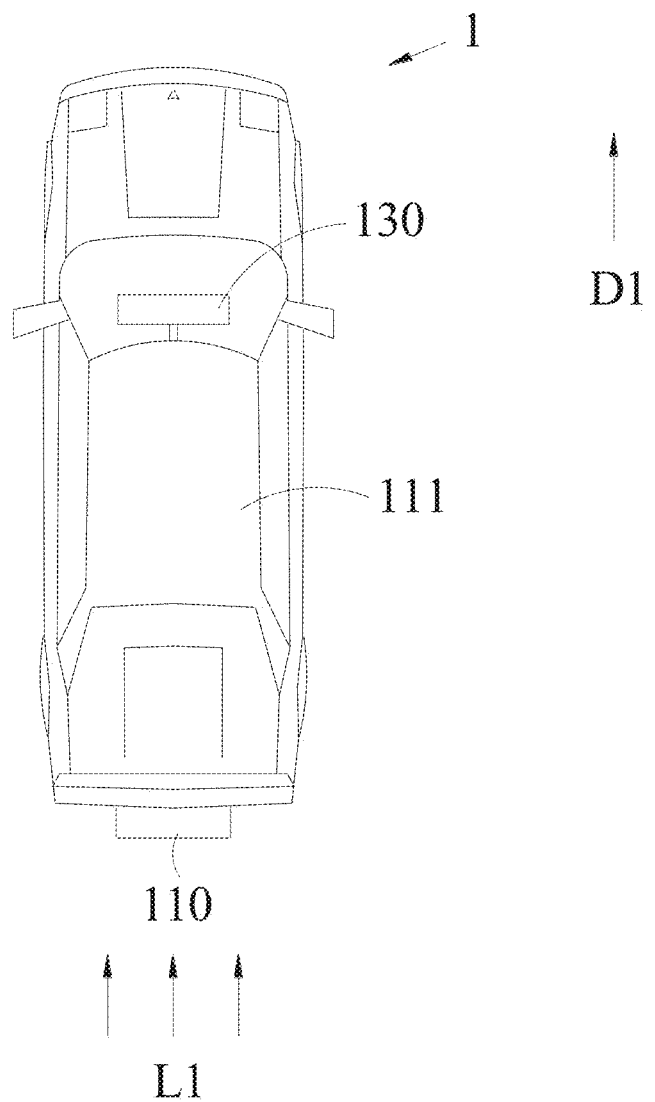
FIGS. 5 to 7 depict schematic diagrams of the disposition of the anti-glare display system according to one embodiment of the present invention.

Please refer to FIG. 5 which depict a schematic diagram of the disposition of the anti-glare display system according to one embodiment of the present invention. As shown, the at least one camera unit 110 may be disposed on the moving device 111, and at least disposed on a rear side of the moving device. That is, the camera unit 110 may be disposed on the the moving device 111 along a direction opposite to the moving direction D1. The camera unit 110 photographs in a direction opposite to the moving direction D1. That is, the camera unit 110 receives the first light L1 whose direction is the same as the moving direction D1.

The moving device 111 may be an automobile, an electronic portable device, an electronic wearable device, an electronic monitoring device, an electronic information device, an electronic communication device, or a machine vision device. In one embodiment, the moving device 111 may be a transportation vehicle or carrier such as an automobile, a scooter, or any movable module such as a portion of an electronic monitor.

In one embodiment, if the moving device 111 is an automobile, the display unit 130 may be one or more rear-view mirrors in a group consisting of a left rear-view mirror, a middle rear-view mirror and a right rear-view mirror of the automobile; or the display unit 130 may be disposed on one or more of the rear-view mirrors of the left rear-view mirror, the middle rear-view mirror, and the right rear-view mirror of the automobile.

Example 1

Following the description above, in Example 1, the moving device 111 is an automobile; the display unit 130 replaces the middle rear-view mirror in the automobile, and the display unit 130 includes the electrochromic element 131, the transflective mirror 132 and the planar display device 133 at the same time.

Figure 6:
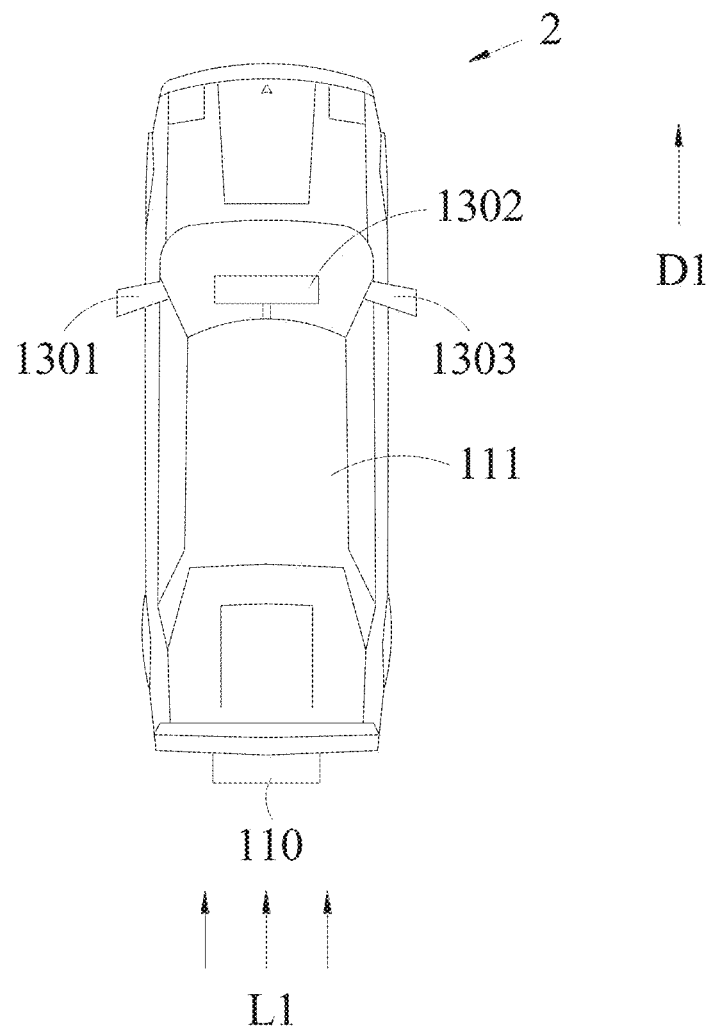

FIG. 6 which depict a schematic diagram of the disposition of the anti-glare display system according to one embodiment of the present invention. As shown, following the description above, the anti-glare display system 2 of the present invention includes at least one camera unit 110, a processing unit 120, at least three display units 130, and a microcontroller MCU. The processing unit 120 is electrically connected to the at least one camera unit 110 to receive the major image Pm photographed by the camera unit 110 and divide the major image Pm to obtain at least three sub-images Pn.

In one embodiment, the at least three sub-images Pn may be the first sub-image P1, the second sub-image P2, and the third sub-image P3. The at least three display units 130 may be the first display unit 1301, the second display unit 1302, the third display unit 1303, and each of the display units 130 includes an electrochromic element 131, and each of the display units 130 is electrically connected to the processing unit 120 respectively.

In one embodiment, any one of the display units 130 may display one or more sub-images in the sub-image Pn. That is, one display unit 130 may display one sub-image Pn or simultaneously display a plurality of sub-images Pn. In one embodiment, the first display unit 1301 may display the first sub-image P1, the second display unit 1302 may display the second sub-image P2, and the third display unit 1303 may display the third sub-image P3; or the first display unit 1301 may display the second sub-image P2, the second display unit 1302 may display the third sub-image P3, and the third display unit 1303 may display the first sub-image P1.

The microcontroller MCU is electrically connected to the processing unit 120 and the at least three display units 130. Wherein, the processing unit 120 controls the microcontroller MCU respectively according to a glare value of each of the sub-images Pn to enable the microcontroller MCU to respectively adjust each of the electrochromic elements 131 corresponding to each of the display units 130 which displays each of the sub-images Pn so as to adjust a degree of discoloration of each of the electrochromic elements 131.

In one embodiment, suppose that three sub-images Pn exist, which respectively are the first sub-image P1, the second sub-image P2, and the third sub-image P3; three display units 130 exist, which respectively are the first display unit 1301 including the first electrochromic element 1311, the second display unit 1302 including the second electrochromic element 1312, and the third display unit 1303 including the third electrochromic element 1313. Wherein the first display unit 1301 may display the first sub-image P1, the second display unit 1302 may display the second sub-image P2, and the third display unit 1303 may display the third sub-image P3.

Wherein, when the glare value of the first sub-image P1 is assumed to be sNGAP1, the glare value of the second sub-image P2 is assumed to be sNGAP2, the glare value of the third sub-image P3 is assumed to be sNGAP3, and sNGAP1>sNGAP2>sNGAP3, the microcontroller MCU then respectively adjusts the first display unit 1301, the second display unit 1302, and the third display unit 1303. This results in the degree of discoloration of the first electrochromic element 1311>the degree of discoloration of the second electrochromic element 1312>the degree of discoloration of the third electrochromic element 1313.

Otherwise, following the description above, when the glare value of the first sub-image P1 is assumed to be sNGAP1, the glare value of the second sub-image P2 is assumed to be sNGAP2, the glare value of the third sub-image P3 is assumed to be sNGAP3, the threshold value of the pre-determined glare value is sNGAPRE, and only sNGAP2 is greater than sNGAPRE in the glare value of each sub-image, the microcontroller MCU then only adjusts the degree of discoloration of the second electrochromic element 1312 in the display unit 130 which displays the second sub-image P2.

Example 2

Following the description above, in Example 2, the moving device 111 is an automobile. Three display units 130 of the first display unit 1301, the second display unit 1302, and the third display unit 1303 respectively replace the left rear-view mirror, the middle rear-view mirror, and right rear-view mirror; the first display unit 1301, the second display unit 1302, and the third display unit 1303 respectively include the electrochromic element 131 and the transflective mirror 132; only the second display unit 1302 includes a planar display device 133.

Example 3

Following the description above, in Example 2, the moving device 111 is an automobile. Three display units 130 of the first display unit 1301, the second display unit 1302, and the third display unit 1303 respectively replace the left rear-view mirror, the middle rear-view mirror, and right rear-view mirror; the first display unit 1301, the second display unit 1302, and the third display unit 1303 respectively include the electrochromic element 131, the transflective mirror 132, and the planar display device 133.

Figure 7:
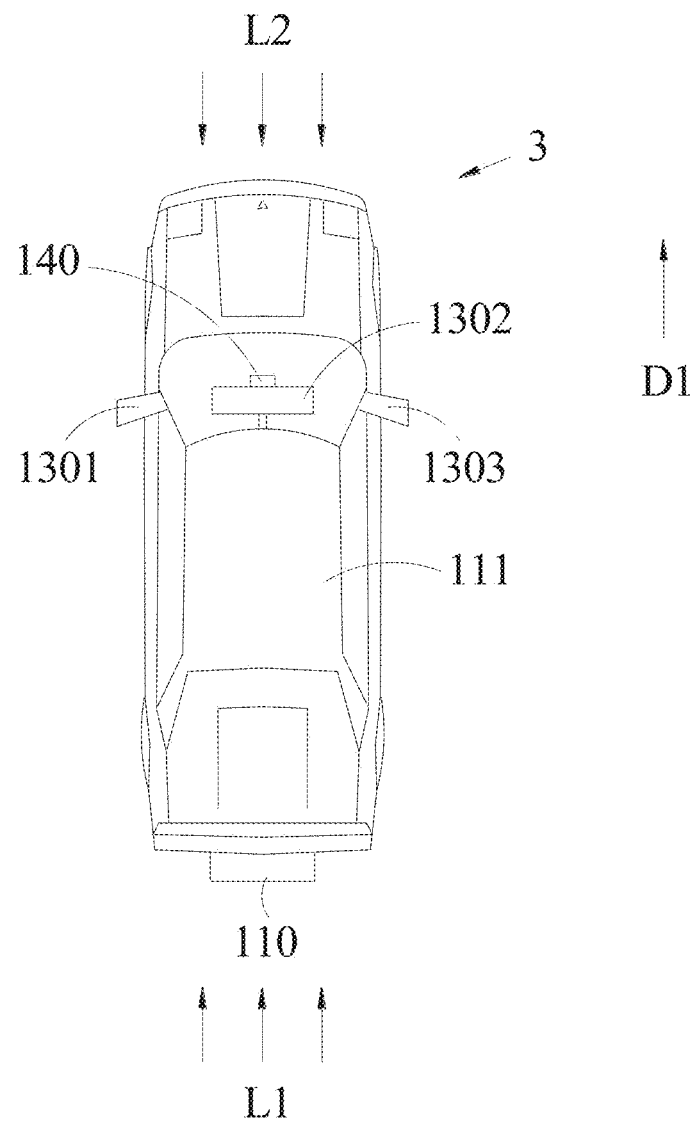

Please refer to FIG. 7 which depicts a schematic diagram of the disposition of the anti-glare display system according to one embodiment of the present invention. As shown, following the description above, the anti-glare display system 3 of the present invention further includes an ambient light detector 140. The ambient light detector 140 may be disposed on the moving device 111 and detect light opposite to the moving direction D1 of the moving device 111. In one embodiment, when the moving device 111 is an automobile, the ambient light detector 140 may then be disposed on the middle rear-view mirror in the automobile and face the front windshield of the automobile to detect the second light L2 opposite to the moving direction D2. In one embodiment, the glare value may be calculated and obtained by the ratio of the glare light source intensity obtained from the sub-image Pn to the ambient light intensity of the second light L2 detected by the ambient light detector 140. In one embodiment, the glare value is an average glare value; the average glare value is an average of the glare value calculated from the ambient light intensity which is detected from the ambient light detector 140 and the glare light source intensity which is obtained from the sub-image Pn and the glare value obtained from the camera unit 110. Otherwise, the glare value is a weighted glare value; the weighted glare value is weighted according to the glare value calculated from the ambient light intensity which is detected from the ambient light detector 140 and the glare light source intensity which is obtained from the sub-image Pn and the glare value obtained from the camera unit 110.

Figure 8:
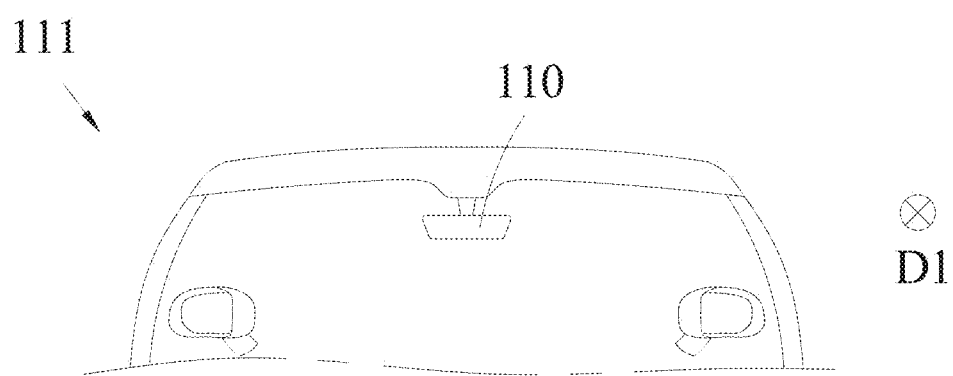
FIGS. 8 and 9 depict schematic diagrams of the disposition of the camera unit of the anti-glare display system according to one embodiment of the present invention.

Please refer to FIG. 8 which a schematic diagram of the disposition of the camera unit of the anti-glare display system according to one embodiment of the present invention. As shown, the camera unit 110 is disposed on the rear side of the moving device 111, and photographs the major image Pm in a direction opposite to the moving direction D1.

Figure 9:
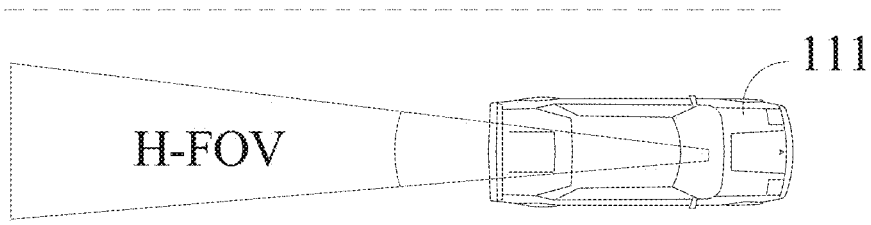
Figure 9:
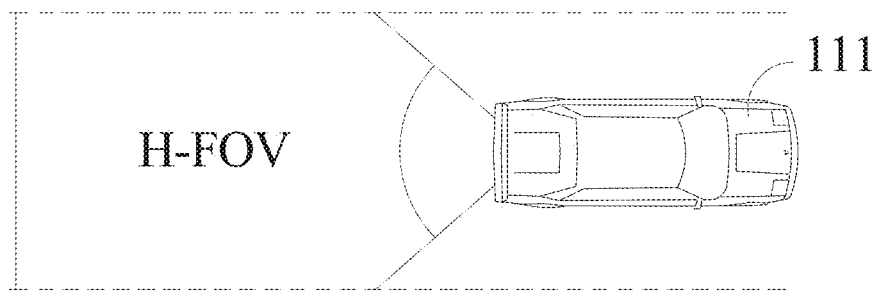

Please refer to FIG. 9 which a schematic diagram of the disposition of the camera unit of the anti-glare display system according to one embodiment of the present invention. FIGS. 9(a) and (b) respectively illustrate schematic diagrams of the horizontal field of views H-FOV of a conventional middle rear-view mirror and the camera unit 110 of the present invention disposed on the rear side of the moving device 111. As shown, the horizontal field of view H-FOV of the camera unit 110 of the present invention is much greater than the horizontal field of view H-FOV of the middle rear-view mirror. Therefore, the anti-glare display system of the present invention may provide the user U with a much wider field of view, thus enhancing the safety in actual use. For instance, the image captured by the camera unit 110 may be an image that is not obscured by the A pillar, B pillar, or C pillar of the automobile.

Figure 10:
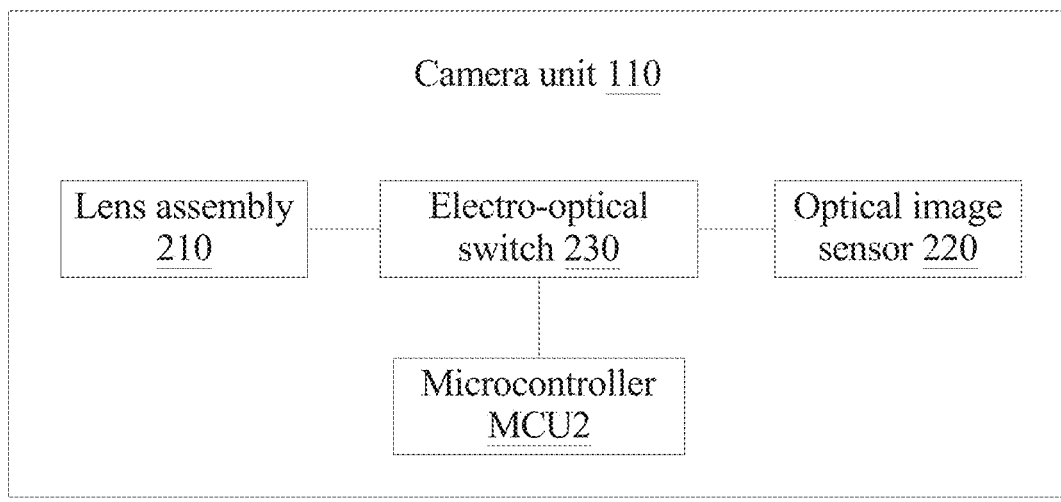
FIG. 10 depicts a block diagram of the camera unit of the anti-glare display system according to one embodiment of the present invention.

Please refer to FIG. 10 which a block diagram of the camera unit of the anti-glare display system according to one embodiment of the present invention.

As shown, the camera unit 110 may include at least one optical image sensor 220, at least one lens assembly 210, at least one electro-optical switch 230, and a microcontroller MCU2. Each of the optical image sensors 220 is positioned in a moving direction of light. Each of the lens assemblies 210 are positioned in the moving direction of light and in front of each of the optical image sensors 220, and an optical axis of the lens assembly 210 overlaps a central normal line of a sensing surface of the optical image sensors 220 in such a way that the light focuses on the optical image sensor 220. Each of the electro-optical switches 230 is positioned in the moving direction of light and each of the electro-optical switches 230 changes the transmittance thereof according to a control signal to obstruct a travel route of the light or to make the light pass through each of the electro-optical switches 230. The microcontroller MCU2 is electrically connected to each of the electro-optical switches 230 and sends the control signal to each of the electro-optical switches 230 according to a user's command. With the disposition of the electro-optical switches 230, the light intake entering the lens assembly 210 or the image time by the optical image sensor 220 may be controlled to further help reduce glare; moreover, the photographing of the optical image sensor 220 may be interrupted or continued according to a user's needs.

Herein, the microcontroller MCU2 controlling each of the electro-optical switches 230 is explained in detail in the following steps: (1) When a user does not need to photograph with the optical image sensor 220, the user issues a user's command to the microcontroller MCU2. The microcontroller MCU2 sends a control signal having a first voltage to each of the electro-optical switches 230 according to the user's command. The first voltage is a positive voltage, and each of the electro-optical switches 230 decreases a transmittance thereof to obstruct a travel route of the light so that each of the optical image sensors 220 does not receive light, resulting in not performing photographing and imaging. (2) When the user needs to photograph with the optical image sensor 220, the user issues a user's command to the microcontroller MCU2. The microcontroller MCU2 sends a control signal having a second voltage to each of the electro-optical switches 230 according to the user's command. Each of the electro-optical switches 230 increases a transmittance thereof to make the light pass through each of the electro-optical switches 230 so that each of the optical image sensors 220 receives light, resulting in performing photographing and imaging. In addition, the value of the first voltage may also be adjusted according to the user's needs so that part of the light passes through each of the electro-optical switches 230 instead of completely obstructing the light entering each of the optical image sensors.

Figure 11:
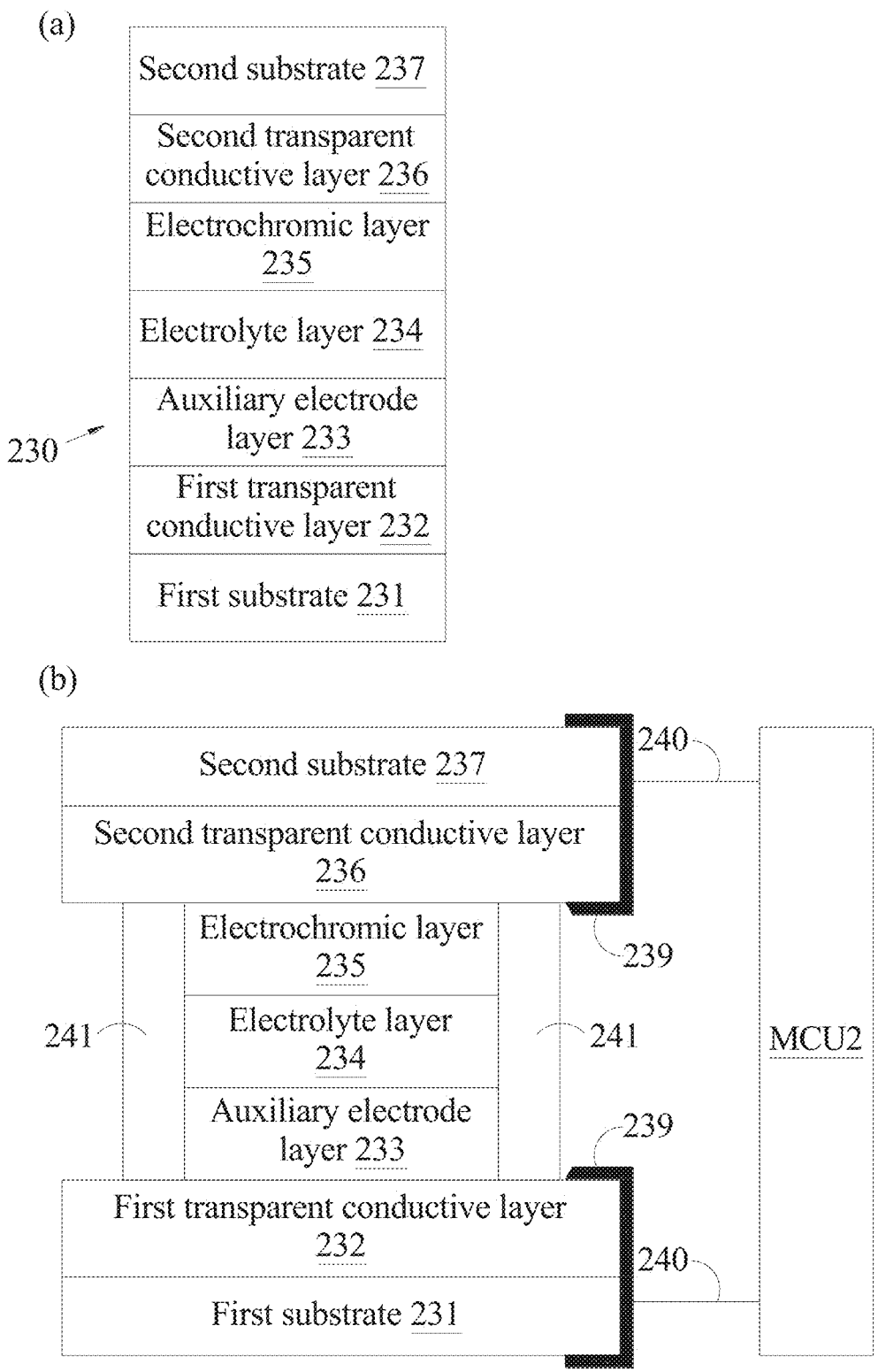
FIG. 11 depicts a schematic diagram of the electro-optical switch of the camera unit according to one embodiment of the present invention.

Please refer to FIG. 11 which depicts a schematic diagram of the electro-optical switch of the camera unit according to one embodiment of the present invention. FIG. 11 (a) depicts a layer structural diagram of the electro-optical switch of the camera unit according to one embodiment of the present invention.

As shown in FIG. 11(a), a single electro-optical switch of the present invention includes a first substrate 231, a first transparent conductive layer 232, an auxiliary electrode layer 233, an electrolyte layer 234, an electrochromic layer 235, a second transparent conductive layer 236, a second substrate 237, and a sealing structure 241. The first transparent conductive layer 232 is disposed on the first substrate 231. The auxiliary electrode layer 233 is disposed on the first transparent conductive layer 232. The electrolyte layer 234 is disposed on the auxiliary electrode layer 233. The electrochromic layer 235 is disposed on the electrolyte layer 234. The second transparent conductive layer 236 is disposed on the electrochromic layer 235. The second substrate 237 is disposed on the second transparent conductive layer 236. The sealing structure 241 is disposed between the first substrate 231 and the second substrate 237 and surrounds the auxiliary electrode layer 233, the electrolyte layer 234, and the electrochromic layer 235 in an attempt to prevent the solution in the electrolyte layer 234 from flowing out.

FIG. 11(b) depicts a cross-section diagram of the electro-optical switch 230 of the camera unit 110 according to one embodiment of the present invention. As shown in FIG. 11(b), U-shape electrodes 239 may be disposed on the electro-optical switch 230. The electrodes 239 may be formed by respectively cladding the end of the first substrate 231 and the first transparent conductive layer 232 as well as the end of the second substrate 237 and the second transparent conductive layer 236 by using metal foils. The microcontroller MCU2 may be electrically connected to the electrodes 239 via wires 240 so that voltage may be sent to the electro-optical switch 230.

The electro-optical switch 230 prompts an oxidation-reduction reaction to occur by applying voltages to the electrochromic layer 235. The ions required for the oxidation-reduction reaction are provided by the electrolyte layer 234. Specifically, when the electrochromic layer 235 undergoes a reduction reaction, the electrochromic layer 235 begins to change to a color such as blue, green, or yellow. The color of the electrochromic layer 235 is selected according to the aforementioned materials having various colors, thus achieving the purpose of obstructing light. When the electrochromic layer 235 undergoes an oxidation reaction, the electrochromic layer 235 begins to become transparent and colorless, which makes the visible light band penetrate the electrochromic layer 235, further allowing light to enter the optical image sensor 220. That is, the action principle of the electro-optical switch 230 is the same as that of the electrochromic element 131.

Figure 12:
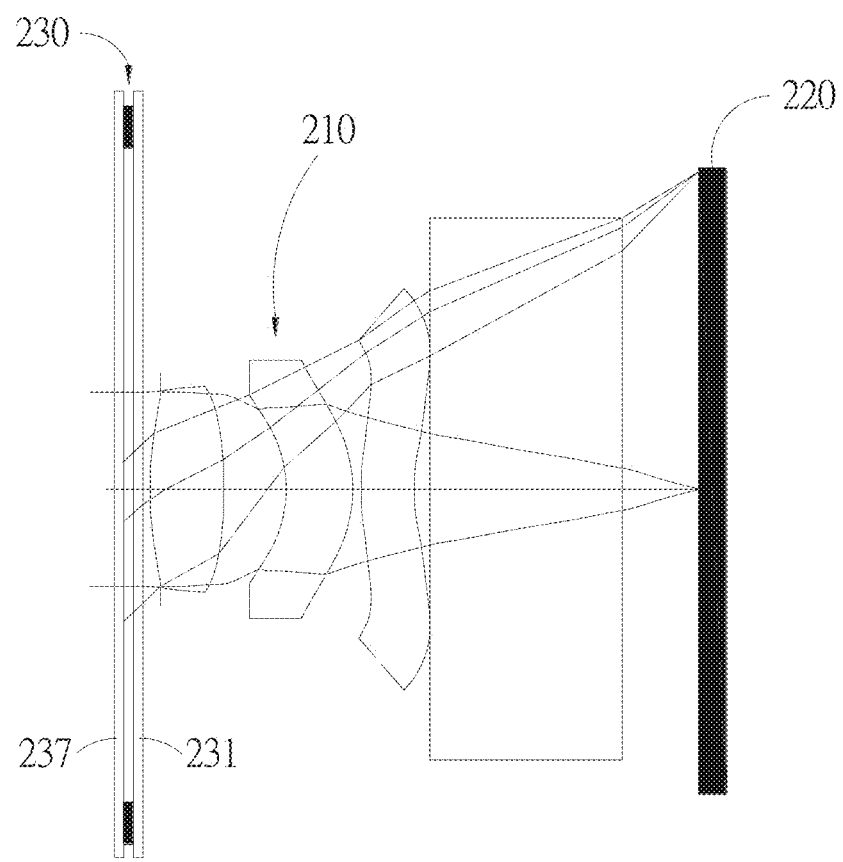
FIG. 12 depicts a configuration diagram of the camera unit according to one embodiment of the present invention.

Please refer to FIG. 12 which depicts a configuration diagram of the camera unit 110 according to one embodiment of the present invention. Wherein, the lens assembly 210 in the camera unit 110 includes five, six, seven, eight, nine, or ten lenses having refractive power, preferably five, six, or seven lenses having refractive power. As shown, to explain more clearly, suppose that the lens assembly 210 is reduced to three lenses. Then, the placement position of the electro-optical switch 230 is perpendicular to the moving direction of the light. The electro-optical switch 230 is positioned in front of the lens assembly 210 and the first substrate 231 of the electro-optical switch 230 is positioned at a side adjacent to the lens assembly 210. The manner in which the electro-optical switch 230 is placed is not particularly limited, and only the electro-optical switch 230 is positioned in front of the lens assembly 210.

In one embodiment, the lenses included in the lens assembly 10 are arranged sequentially from an object side to an image side; the lens assembly satisfies the following condition: 0.1≤InTL/HOS≤0.95; wherein, HOS is a distance from an object side surface of a lens farthest from an image plane to a sensing surface of the optical image sensor on an optical axis; InTL is a distance from an object side surface of a lens furthest from the image plane to a lens closest to the image plane on an optical axis.

In some embodiments, the lens assembly 10 includes five lenses with refractive power, which are a first lens, a second lens, a third lens, a fourth lens, and a fifth lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the fifth lens on an optical axis.

In some embodiments, the lens assembly 10 includes six lenses with refractive power, which are a first lens, a second lens, a third lens, a fourth lens, a fifth lens, and a sixth lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the sixth lens on an optical axis.

In some embodiments, the lens assembly 10 includes seven lenses with refractive power, which are a first lens, a second lens, a third lens, a fourth lens, a fifth lens, a sixth lens, and seventh lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the seventh lens on an optical axis.

In some embodiments, the lens assembly 10 includes eight lenses with refractive power, which are a first lens, a second lens, a third lens, a fourth lens, a fifth lens, a sixth lens, seventh lens, and eighth lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the eighth lens on an optical axis.

In some embodiments, the lens assembly 10 includes nine lenses with refractive power, which are a first lens, a second lens, a third lens, a fourth lens, a fifth lens, a sixth lens, seventh lens, eighth lens, and ninth lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the ninth lens on an optical axis.

In some embodiments, the lens assembly 10 includes ten lenses with refractive power, which are a first lens, a second lens, a third lens, a fourth lens, a fifth lens, a sixth lens, seventh lens, eighth lens, ninth lens, and tenth lens sequentially arranged from an object side to an image side, and the lens assembly 10 satisfies the following condition: 0.1≤InTL/HOS≤0.95; wherein, HOS is a distance from an object side surface of the first lens to the image plane on an optical axis; InTL is a distance from an object side surface of the first lens to an image side surface of the tenth lens on an optical axis.

The First Optical Embodiment

Figure 13:
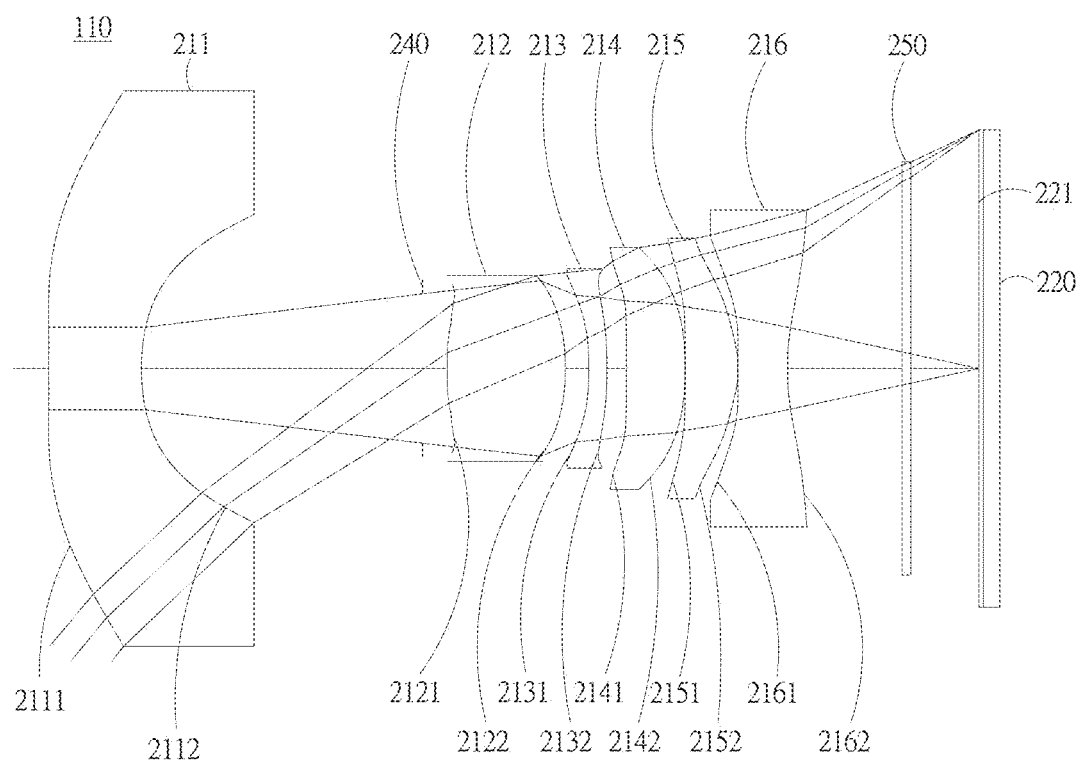
FIG. 13 depicts a configuration diagram of the lens assembly of the camera unit according to the first optical embodiment of the present invention.
Figure 14:
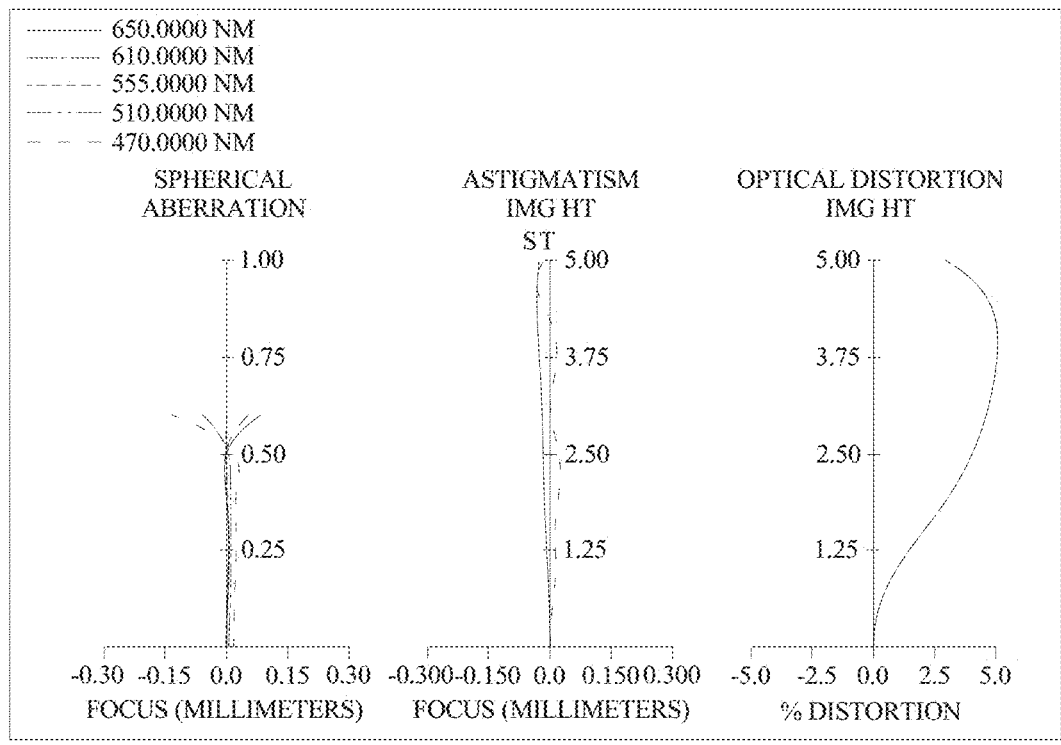
FIG. 14 depicts a curve diagram of the spherical aberration, astigmatism, and optical distortion illustrated sequentially from the left to the right according to the first optical embodiment of the present invention.

Please refer to FIG. 13 and FIG. 14. FIG. 13 depicts a configuration diagram of the lens assembly of the camera unit according to the first embodiment of the present invention. FIG. 14 is a curve diagram of the spherical aberration, astigmatism, and optical distortion illustrated sequentially from the left to the right according to the first optical embodiment of the present invention. As shown in FIG. 13, the camera unit 110 includes a first lens 211, an aperture 240, a second lens 212, a third lens 213, a four lens 214, a fifth lens 215, a sixth lens 216, an IR-cut filter 250, an image plane 221, and image sensor elements 220 sequentially displayed from an object side to an image side.

The first lens 211 has negative refractive power and is made of a plastic material. The object side surface 2111 thereof is a concave surface and the image side surface 2112 thereof is a concave surface, both of which are aspheric. The object side surface 2111 thereof has two inflection points. ARS11 denotes the arc length of the maximum effective half diameter of the object side surface 2111 of the first lens 211. ARS12 denotes the arc length of the maximum effective half diameter of the image side surface 2112 of the first lens 211. ARE11 denotes the arc length of half the entrance pupil diameter (HEP) of the object side surface 2111 of the first lens 211. ARE12 denotes the arc length of half the entrance pupil diameter (HEP) of the image side surface 2112 of the first lens 211. TP1 is the thickness of the first lens 211 on the optical axis.

SGI111 denotes a distance parallel to the optical axis from the inflection point on the object side surface 2111 of the first lens 211 which is the nearest to the optical axis to an axial point on the object side surface 2111 of the first lens 211. SGI121 denotes a distance parallel to an optical axis from an inflection point on the image side surface 2112 of the first lens 211 which is the nearest to the optical axis to an axial point on the image side surface 2112 of the first lens 211. The following conditions are satisfied: SGI111=−0.0031 mm; |SGI111|/(|SGI111|+TP1)=0.0016.

SGI112 denotes the distance parallel to the optical axis from the inflection point on the object side surface 2111 of the first lens 211 which is the second nearest to the optical axis to an axial point on the object side surface 2111 of the first lens 211. SGI122 denotes the distance parallel to an optical axis from an inflection point on the image side surface 2112 of the first lens 211 which is the second nearest to the optical axis to an axial point on the image side surface 2112 of the first lens 211. The following conditions are satisfied: SGI112=1.3178 mm; |SGI112|/(|SGI112|+TP1) =0.4052.

HIF111 denotes the distance perpendicular to the optical axis between the inflection point on the object side surface 2111 of the first lens 211 which is the nearest to the optical axis and the optical axis. HIF121 denotes the distance perpendicular to the optical axis between an axial point on the image side surface 2112 of the first lens 211 and an inflection point on the image side surface 2112 of the first lens 211 which is the nearest to the optical axis. The following conditions are satisfied: HIF111=0.5557 mm; HIF111/HOI=0.1111.

HIF112 denotes the distance perpendicular to the optical axis between the inflection point on the object side surface 2111 of the first lens 211 which is the second nearest to the optical axis and the optical axis. HIF122 denotes the distance perpendicular to the optical axis between an axial point on the image side surface 2112 of the first lens 211 and an inflection point on the image side surface 2112 of the first lens 211 which is the second nearest to the optical axis. The following conditions are satisfied: HIF112=5.3732 mm; HIF112/HOI=1.0746.

The second lens 212 has positive refractive power and is made of a plastic material. The object side surface 2121 thereof is a convex surface and the image side surface 2122 thereof is a convex surface, both of which are aspheric. The object side surface 2121 thereof has an inflection point. ARS21 denotes the arc length of the maximum effective half diameter of the object side surface 2121 of the second lens 212. ARS22 denotes the arc length of the maximum effective half diameter of the image side surface 2122 of the second lens 212. ARE21 denotes an arc length of half the entrance pupil diameter (HEP) of the object side surface 2121 of the second lens 212. ARE22 denotes the arc length of half the entrance pupil diameter (HEP) of the image side surface 2122 of the second lens 212. TP2 is the thickness of the second lens 212 on the optical axis.

SGI211 denotes the distance parallel to the optical axis from the inflection point on the object side surface 2121 of the second lens 212 which is the nearest to the optical axis to an axial point on the object side surface 2121 of the second lens 212. SGI221 denotes the distance parallel to an optical axis from an inflection point on the image side surface 2122 of the second lens 212 which is the nearest to the optical axis to an axial point on the image side surface 2122 of the second lens 212. The following conditions are satisfied: SGI211=0.1069 mm; |SGI211|/(|SGI211|+TP2) =0.0412; SGI221=0 mm; |SGI221|/(|SGI221|+TP2)=0.

HIF211 denotes the distance perpendicular to the optical axis between the inflection point on the object side surface 2121 of the second lens 212 which is the nearest to the optical axis and the optical axis. HIF221 denotes the distance perpendicular to the optical axis between an axial point on the image side surface 2122 of the second lens 212 and an inflection point on the image side surface 2122 of the second lens 212 which is the nearest to the optical axis. The following conditions are satisfied: HIF211=1.1264 mm; HIF211/HOI=0.2253; HIF221=0 mm; HIF221/HOI=0.

The third lens 213 has negative refractive power and is made of a plastic material. The object side surface 2131 thereof is a concave surface and the image side surface 2132 thereof is a convex surface, both of which are aspheric. The object side surface 2131 and the image side surface 2132 thereof both have an inflection point. ARS31 denotes the arc length of the maximum effective half diameter of the object side surface 2131 of the third lens 213. ARS32 denotes an arc length of the maximum effective half diameter of the image side surface 2132 of the third lens 213. ARE31 denotes the arc length of half the entrance pupil diameter (HEP) of the object side surface 2131 of the third lens 213. ARS32 denotes the arc length of half the entrance pupil diameter (HEP) of the image side surface 2132 of the third lens 213. TP3 is the thickness of the third lens 213 on the optical axis.

SGI311 denotes the distance parallel to the optical axis from the inflection point on the object side surface 2131 of the third lens 213 which is the nearest to the optical axis to an axial point on the object side surface 2131 of the third lens 213. SGI321 denotes the distance parallel to an optical axis from an inflection point on the image side surface 2132 of the third lens 213 which is the nearest to the optical axis to an axial point on the image side surface 2132 of the third lens 213. The following conditions are satisfied: SGI311=−0.3041 mm; |SGI311|/(|SGI311|+TP3)=0.4445; SGI321=−0.1172 mm; |SGI321|/(|SGI321|+TP3)=0.2357.

HIF311 denotes the distance perpendicular to the optical axis between the inflection point on the object side surface 2131 of the third lens 213 which is the nearest to the optical axis and the optical axis. HIF321 denotes the distance perpendicular to the optical axis between an axial point on the image side surface 2132 of the third lens 213 and an inflection point on the image side surface 2132 of the third lens 213 which is the nearest to the optical axis. The following conditions are satisfied: HIF311=1.5907 mm; HIF311/HOI=0.3181; HIF321=1.3380 mm; HIF321/HOI=0.2676.

The fourth lens 214 has positive refractive power and is made of a plastic material. The object side surface 2141 thereof is a convex surface and the image side surface 2142 thereof is a concave surface, both of which are aspheric. The object side surface 2141 thereof has two inflection points and the image side surface 2142 thereof has an inflection point. ARS41 denotes the arc length of the maximum effective half diameter of the object side surface 2141 of the fourth lens 214. ARS42 denotes the arc length of the maximum effective half diameter of the image side surface 2142 of the fourth lens 214. ARE41 denotes the arc length of half the entrance pupil diameter (HEP) of the object side surface 2141 of the fourth lens 214. ARS42 denotes the arc length of half the entrance pupil diameter (HEP) of the image side surface 2142 of the fourth lens 214. TP4 is the thickness of the fourth lens 214 on the optical axis.

SGI411 denotes the distance parallel to the optical axis from the inflection point on the object side surface 2141 of the fourth lens 214 which is the nearest to the optical axis to an axial point on the object side surface 2141 of the fourth lens 214. SGI421 denotes the distance parallel to an optical axis from an inflection point on the image side surface 2142 of the fourth lens 214 which is the nearest to the optical axis to an axial point on the image side surface 2142 of the fourth lens 214. The following conditions are satisfied: SGI411=0.0070 mm; |SGI411|/(|SGI411|+TP4)=0.0056; SGI421=0.0006 mm; |SGI421|/(|SGI421|+TP4)=0.0005.

SGI412 denotes the distance parallel to the optical axis from the inflection point on the object side surface 2141 of the fourth lens 214 which is the second nearest to the optical axis to an axial point on the object side surface 2141 of the fourth lens 214. SGI422 denotes the distance parallel to an optical axis from an inflection point on the image side surface 2142 of the fourth lens 214 which is the second nearest to the optical axis to an axial point on the image side surface 2142 of the fourth lens 214. The following conditions are satisfied: SGI412=−0.2078 mm; SGI412|/(|SGI412|+TP4)=0.1439.

HIF411 denotes the distance perpendicular to the optical axis between the inflection point on the object side surface 2141 of the fourth lens 214 which is the nearest to the optical axis and the optical axis. HIF421 denotes the distance perpendicular to the optical axis between an axial point on the image side surface 2142 of the fourth lens 214 and an inflection point on the image side surface 2142 of the fourth lens 214 which is the nearest to the optical axis. The following conditions are satisfied: HIF411=0.4706 mm; HIF411/HOI=0.0941; HIF421=0.1721 mm; HIF421/HOI=0.0344.

HIF412 denotes the distance perpendicular to the optical axis between the inflection point on the object side surface 2141 of the fourth lens 214 which is the second nearest to the optical axis and the optical axis. HIF422 denotes the distance perpendicular to the optical axis between an axial point on the image side surface 2142 of the fourth lens 214 and an inflection point on the image side surface 2142 of the fourth lens 214 which is the second nearest to the optical axis. The following conditions are satisfied: HIF412=2.0421 mm; HIF412/HOI=0.4084.

The fifth lens 215 has positive refractive power and is made of a plastic material. The object side surface 2151 thereof is a convex surface and the image side surface 2152 thereof is a convex surface, both of which are aspheric. The object side surface 2151 thereof has two inflection points and the image side surface 2152 thereof has an inflection point. ARS51 denotes the arc length of the maximum effective half diameter of the object side surface 2151 of the fifth lens 215. ARS52 denotes the arc length of the maximum effective half diameter of the image side surface 2152 of the fifth lens 215. ARE51 denotes the arc length of half the entrance pupil diameter (HEP) of the object side surface 2151 of the fifth lens 215. ARE52 denotes the arc length of half the entrance pupil diameter (HEP) of the image side surface 2152 of the fifth lens 215. TP5 is the thickness of the fifth lens 215 on the optical axis.

SGI511 denotes the distance parallel to the optical axis from the inflection point on the object side surface 2151 of the fifth lens 215 which is the nearest to the optical axis to an axial point on the object side surface 2151 of the fifth lens 215. SGI521 denotes the distance parallel to an optical axis from an inflection point on the image side surface 2152 of the fifth lens 215 which is the nearest to the optical axis to an axial point on the image side surface 2152 of the fifth lens 215. The following conditions are satisfied: SGI511=0.00364 mm; |SGI511|/(|SGI511|+TP5)=0.00338; SGI521=−0.63365 mm; |SGI521|/(|SGI521|+TP5)=0.37154.

SGI512 denotes the distance parallel to the optical axis from the inflection point on the object side surface 2151 of the fifth lens 215 which is the second nearest to the optical axis to an axial point on the object side surface 2151 of the fifth lens 215. SGI522 denotes the distance parallel to an optical axis from an inflection point on the image side surface 2152 of the fifth lens 215 which is the second nearest to the optical axis to an axial point on the image side surface 2152 of the fifth lens 215. The following conditions are satisfied: SGI512=−0.32032 mm; SGI512|/(|SGI512|+TP5)=0.23009.

SGI513 denotes the distance parallel to the optical axis from the inflection point on the object side surface 2151 of the fifth lens 215 which is the third nearest to the optical axis to an axial point on the object side surface 2151 of the fifth lens 215. SGI523 denotes the distance parallel to an optical axis from an inflection point on the image side surface 2152 of the fifth lens 215 which is the third nearest to the optical axis to an axial point on the image side surface 2152 of the fifth lens 215. The following conditions are satisfied: SGI513=0 mm; SGI513|/(|SGI513|+TP5)=0; SGI523=0 mm; SGI523|/(|SGI523|+TP5)=0.

SGI514 denotes the distance parallel to the optical axis from the inflection point on the object side surface 2151 of the fifth lens 215 which is the fourth nearest to the optical axis to an axial point on the object side surface 2151 of the fifth lens 215. SGI524 denotes a distance parallel to an optical axis from an inflection point on the image side surface 2152 of the fifth lens 215 which is the fourth nearest to the optical axis to an axial point on the image side surface 2152 of the fifth lens 215. The following conditions are satisfied: SGI514=0 mm; SGI514|/(|SGI514|+TP5)=0; SGI524=0 mm; |SGI524|/(|SGI524|+TP5)=0.

HIF511 denotes the distance perpendicular to the optical axis between the inflection point on the object side surface 2151 of the fifth lens 215 which is the nearest to the optical axis and the optical axis. HIF521 denotes the distance perpendicular to the optical axis between the optical axis and an inflection point on the image side surface 2152 of the fifth lens 215 which is the nearest to the optical axis. The following conditions are satisfied: HIF511=0.28212 mm; HIF511/HOI=0.05642; HIF521=2.13850 mm; HIF521/HOI=0.42770.

HIF512 denotes the distance perpendicular to the optical axis between the inflection point on the object side surface 2151 of the fifth lens 215 which is the second nearest to the optical axis and the optical axis. HIF522 denotes the distance perpendicular to the optical axis between the optical axis and an inflection point on the image side surface 2152 of the fifth lens 215 which is the second nearest to the optical axis. The following conditions are satisfied: HIF512=2.51384 mm; HIF512/HOI=0.50277.

HIF513 denotes the distance perpendicular to the optical axis between the inflection point on the object side surface 2151 of the fifth lens 215 which is the third nearest to the optical axis and the optical axis. HIF523 denotes the distance perpendicular to the optical axis between the optical axis and an inflection point on the image side surface 2152 of the fifth lens 215 which is the third nearest to the optical axis. The following conditions are satisfied: HHIF513=0 mm; HIF513/HOI=0; HIF523=0 mm; HIF523/HOI=0.

HIF514 denotes the distance perpendicular to the optical axis between the inflection point on the object side surface 2151 of the fifth lens 215 which is the fourth nearest to the optical axis and the optical axis. HIF524 denotes the distance perpendicular to the optical axis between the optical axis and an inflection point on the image side surface 2152 of the fifth lens 215 which is the fourth nearest to the optical axis. The following conditions are satisfied: HIF514=0 mm; HIF514/HOI=0; HIF524=0 mm; HIF524/HOI=0.

The sixth lens 216 has negative refractive power and is made of a plastic material. The object side surface 2161 thereof is a concave surface and the image side surface 2162 thereof is a concave surface. The object side surface 2161 has two inflection points and the image side surface 2162 thereof has an inflection point. Therefore, it may be effective to adjust the angle at which each field of view is incident on the sixth lens 216 to improve the aberration. ARS61 denotes the arc length of the maximum effective half diameter of the object side surface 2161 of the sixth lens 216. ARS62 denotes the arc length of the maximum effective half diameter of the image side surface 2162 of the sixth lens 216. ARE61 denotes the arc length of half the entrance pupil diameter (HEP) of the object side surface 2161 of the sixth lens 216. ARS62 denotes the arc length of half the entrance pupil diameter (HEP) of the image side surface 2162 of the sixth lens 216. TP6 is the thickness of the sixth lens 216 on the optical axis.

SGI611 denotes the distance parallel to the optical axis from the inflection point on the object side surface 2161 of the sixth lens 216 which is the nearest to the optical axis to an axial point on the object side surface 2161 of the sixth lens 216. SGI621 denotes the distance parallel to an optical axis from an inflection point on the image side surface 2162 of the sixth lens 216 which is the nearest to the optical axis to an axial point on the image side surface 2162 of the sixth lens 216. The following conditions are satisfied: SGI611=−0.38558 mm; |SGI611|/(|SGI611|+TP6)= 0.27212; SGI621=0.12386 mm; |SGI621|/(|SGI621|+TP6)= 0.10722.

SGI612 denotes the distance parallel to the optical axis from the inflection point on the object side surface 2161 of the sixth lens 216 which is the second nearest to the optical axis to an axial point on the object side surface 2161 of the sixth lens 216. SGI621 denotes the distance parallel to an optical axis from an inflection point on the image side surface 2162 of the sixth lens 216 which is the second nearest to the optical axis to an axial point on the image side surface 2162 of the sixth lens 216. The following conditions are satisfied: SGI612=−0.47400 mm; |SGI612|/(|SGI612|+TP6)=0.31488; |SGI622=0 mm; |SGI622|/(|SGI622|+TP6)=0.

HIF611 denotes the distance perpendicular to the optical axis between the inflection point on the object side surface 2161 of the sixth lens 216 which is the nearest to the optical axis and the optical axis. HIF621 denotes the distance perpendicular to the optical axis between the inflection point on the image side surface 2162 of the sixth lens 216 which is the nearest to the optical axis and the optical axis. The following conditions are satisfied: HIF611=2.24283 mm; HIF611/HOI=0.44857; HIF621=1.07376 mm; HIF621/HOI=0.21475.

HIF612 denotes the distance perpendicular to the optical axis between the inflection point on the object side surface 2161 of the sixth lens 216 which is the second nearest to the optical axis and the optical axis. HIF622 denotes the distance perpendicular to the optical axis between the inflection point on the image side surface 2162 of the sixth lens 216 which is the second nearest to the optical axis and the optical axis. The following conditions are satisfied: HIF611=2.24283 mm; HIF612=2.48895 mm; HIF612/HOI=0.49779.

HIF613 denotes the distance perpendicular to the optical axis between the inflection point on the object side surface 2161 of the sixth lens 216 which is the third nearest to the optical axis and the optical axis. HIF623 denotes the distance perpendicular to the optical axis between the inflection point on the image side surface 2162 of the sixth lens 216 which is the third nearest to the optical axis and the optical axis. The following conditions are satisfied: HIF613=0 mm; HIF613/HOI=0; HIF623=0 mm; HIF623/HOI=0.

HIF614 denotes the distance perpendicular to the optical axis between the inflection point on the object side surface 2161 of the sixth lens 216 which is the fourth nearest to the optical axis and the optical axis. HIF624 denotes the distance perpendicular to the optical axis between the inflection point on the image side surface 2162 of the sixth lens 216 which is the fourth nearest to the optical axis and the optical axis. The following conditions are satisfied: HIF614=0 mm; HIF614/HOI=0; HIF624=0 mm; HIF624/HOI=0.

The IR-cut filter 250 is made of glass and is disposed between the sixth lens 216 and the image plane 221, which does not affect the focal length of the optical image capturing module.

In the lens assembly 210 of the embodiment, f is the focal length of the lens assembly 210. HEP is the entrance pupil diameter of the lens assembly 210. HAF is half of the maximum view angle of the lens assembly 10. The detailed parameters are shown as below: f=4.075 mm, f/HEP=1.4, HAF=50.001°, and tan(HAF)=1.1918.

In the lens assembly 210 of the embodiment, f1 is the focal length of the first lens assembly 211. f6 is a focal length of the sixth lens assembly 216. The following conditions are satisfied: f1=−7.828 mm; f/f1=0.52060; f6=−4.886; and |f1|>|f6|.

In the lens assembly 210 of the embodiment, the focal lengths of the second lens 212 to the fifth lens 215 are f2, f3, f4, and f5, respectively. The following conditions are satisfied: |f2|+|f3|+|f4|+|f5|=95.50815 mm; |f1|+|f6|=12.71352 mm and |f2|+|f3|+|f4|+|f5|>|f1|+|f6|.

PPR is the ratio of the focal length f of the lens assembly 210 to a focal length fp of each of lenses with positive refractive power. NPR is the ratio of the focal length f of the lens assembly 210 to a focal length fn of each of lenses with negative refractive power. In the lens assembly 210 of the embodiment. The sum of the PPR of all lenses with positive refractive power is ΣPPR=f/f2+f/f4+f/f5=1.63290. The sum of the NPR of all lenses with negative refractive power is ΣNPR=|f/f1|+|f/f3|+f/f6|=1.51305, and ΣPPR/|ΣNPR|=1.07921. The following conditions are also satisfied: |f/f2|=0.69101; |f/f3|=0.15834; |f/f4|=0.06883; |f/f5|=0.87305; |f/f6|=0.83412.

In the camera unit of the embodiment, InTL is the distance on the optical axis from an object side surface 2111 of the first lens 211 to an image side surface 2162 of the sixth lens 216. HOS is the distance on the optical axis from an object side surface 2111 of the first lens 211 to the image plane 221. InS is a distance from the aperture 240 to the image plane 221. HOI is defined as half the diagonal of the sensing field of the image sensor elements 220. BFL is the distance from the image side surface 2162 of the sixth lens 216 and the image plane 221. The following conditions are satisfied: InTL+BFL=HOS; HOS=19.54120 mm; HOI=5.0 mm; HOS/HOI=3.90824; HOS/f=4.7952; InS=11.685 mm; and InS/HOS=0.59794.

In the lens assembly 210 of the embodiment, ΣTP is the sum of the thicknesses of all the lenses with refractive power on the optical axis. The following condition is satisfied: ΣTP=8.13899 mm, ΣTP/InTL=0.52477, and InTL/HOS=0.917102. Therefore, the contrast ratio of system imaging and the yield rate of lens manufacturing may be attended simultaneously. Moreover, an appropriate back focal length is provided to accommodate other elements.

In the lens assembly 210 of the embodiment, R1 is the curvature radius of the object side surface 2111 of the first lens 211. R2 is the curvature radius of the image side surface 2112 of the first lens 211. The following condition is satisfied: |R1/R2|=8.99987. Therefore, the first lens 211 is equipped with appropriate intensity of positive refractive power to prevent the spherical aberration from increasing too fast.

In the lens assembly 210 of the embodiment, R11 is the curvature radius of the object side surface 2161 of the sixth lens 216. R12 is the curvature radius of the image side surface 2162 of the sixth lens 16. This following condition is satisfied: (R11−R12)/(R11+R12)=1.27780. Therefore, it is advantageous to correct the astigmatism generated by the lens assembly 210.

In the lens assembly 210 of the embodiment, ΣPP is the sum of the focal lengths of all lenses with positive refractive power. The following conditions are satisfied: ΣPP=f2+f4+f5=69.770 mm and f5/(f2+f4+f5)=0.067. Therefore, it is beneficial to properly distribute the positive refractive power of a single lens to other positive lenses to suppress the generation of significant aberrations during the traveling of incident light.

In the lens assembly 210 of the embodiment, ΣNP is the sum of the focal lengths of all lenses with negative refractive power. The following conditions are satisfied: ΣNP=f1+f3+f6=−38.451 mm and f6/(f1+f3+f6)=0.127. Therefore, it is beneficial to properly distribute the negative refractive power of the sixth lens 216 to other negative lenses to suppress the generation of significant aberrations during the traveling of incident light.

In the lens assembly 210 of the embodiment, IN12 is the distance between the first lens 211 and the second lens 212 on the optical axis. The following condition is satisfied: IN12=6.418 mm; IN12/f=1.57491. Therefore, it is beneficial to improve the chromatic aberration of the lenses so as to enhance the performance.

In the lens assembly 210 of the embodiment, IN56 is a distance between the fifth lens 215 and the sixth lens 216 on the optical axis. The following condition is satisfied: IN56=0.025 mm; IN56/f=0.00613. Therefore, it is beneficial to improve the chromatic aberration of the lenses so as to enhance the performance.

In the lens assembly 210 of the embodiment, TP1 and TP2 are respectively the thicknesses of the first lens 211 and the second lens 212 on the optical axis. The following condition is satisfied: TP1=1.934 mm; TP2=2.486 mm; and (TP1+IN12)/TP2=3.36005. Therefore, it is beneficial to control the sensitivity produced by the lens assembly 10 so as to enhance the performance.

In the lens assembly 210 of the embodiment, TP5 and TP6 are respectively the thicknesses of the fifth lens 215 and the sixth lens 216 on the optical axis. IN56 is a distance between the two lenses on the optical axis. The following conditions are satisfied: TP5=1.072 mm; TP6=1.031 mm; (TP6+IN56)/TP5=0.98555. Therefore, it is beneficial to control the sensitivity produced by the optical image capturing module so as to enhance the performance.

In the lens assembly 210 of the embodiment, IN34 is a distance between the third lens 213 and the fourth lens 214 on the optical axis. IN45 is a distance between the fourth lens 214 and the fifth lens 215 on the optical axis. The following conditions are satisfied: IN34=0.401 mm; IN45=0.025 mm; and TP4/(IN34+TP4+IN45)=0.74376. Therefore, it is beneficial to slightly correct the aberration generated by the incident light advancing in the process layer upon layer so as to decrease the overall height of the system.

In the lens assembly 210 of the embodiment, InRS51 is the horizontal distance parallel to an optical axis from a maximum effective half diameter position to an axial point on the object side surface 2151 of the fifth lens 215. InRS52 is the horizontal distance parallel to an optical axis from a maximum effective half diameter position to an axial point on the image side surface 2152 of the fifth lens 215. TP5 is the thickness of the fifth lens 215 on the optical axis. The following condition is satisfied: InRS51=−0.34789 mm; InRS52=−0.88185 mm; InRS51|/TP5=0.32458 and InRS52|/TP5=0.82276. Therefore, it is advantageous for the lens to be manufactured and formed so as to maintain minimization.

In the lens assembly 210 of the embodiment, HVT51 is the distance perpendicular to the optical axis between a critical point on an object side surface 2151 of the fifth lens 215 and the optical axis. HVT52 is the distance perpendicular to the optical axis between a critical point on an image side surface 2152 of the fifth lens 215 and the optical axis. The following conditions are satisfied: HVT51=0.515349 mm; HVT52=0 mm.

In the lens assembly 210 of the embodiment, InRS61 is the horizontal distance parallel to an optical axis from a maximum effective half diameter position to an axial point on the object side surface 2161 of the sixth lens 216. InRS62 is the horizontal distance parallel to an optical axis from a maximum effective half diameter position to an axial point on the image side surface 2162 of the sixth lens 216. TP6 is the thickness of the sixth lens 216 on the optical axis. The following conditions are satisfied: InRS61=−0.58390 mm; InRS62=0.41976 mm; InRS61|/TP6=0.56616 and InRS62|/TP6=0.40700. Therefore, it is advantageous for the lens to be manufactured and formed so as to maintain minimization.

In the lens assembly 210 of the embodiment, HVT61 is the distance perpendicular to the optical axis between a critical point on an object side surface 2161 of the sixth lens 216 and the optical axis. HVT62 is the distance perpendicular to the optical axis between a critical point on an image side surface 2162 of the sixth lens 216 and the optical axis. The following conditions are satisfied: HVT61=0 mm; HVT62=0 mm.

In the lens assembly 210 of the embodiment, the following conditions are satisfied: HVT51/HOI=0.1031. Therefore, it is beneficial to correct the aberration of the surrounding view field of the camera unit.

In the lens assembly 210 of the embodiment, the following conditions are satisfied: HVT51/HOS=0.02634. Therefore, it is beneficial to correct the aberration of the surrounding view field of the camera unit.

In the lens assembly 210 of the embodiment, the second lens 212, the third lens 213, and the sixth lens 216 have negative refractive power. A dispersion coefficient of the second lens 212 is NA2. A dispersion coefficient of the third lens 213 is NA3. A dispersion coefficient of the sixth lens 216 is NA6. The following condition is satisfied: NA6/NA2≤1. Therefore, it is beneficial to correct the aberration of the lens assembly 210.

In the camera unit 110 of the embodiment, TDT refers to TV distortion when an image is formed. ODT refers to optical distortion when an image is formed. The following conditions are satisfied: TDT=2.124%; ODT=5.076%.

In the lens assembly 210 of the embodiment, LS is 12 mm. PhiA is 2*EHD62=6.726 mm (EHD62: the maximum effective half diameter of the image side 2162 of the sixth lens 216). PhiC=PhiA+2*TH2=7.026 mm; PhiD=PhiC+2*(TH1+TH2)=7.426 mm; TH1 is 0.2 mm; TH2 is 0.15 mm; PhiA/PhiD is 0.9057; TH1+TH2 is 0.35 mm; (TH1+TH2)/HOI is 0.035; (TH1+TH2)/HOS is 0.0179; 2*(TH1+TH2)/PhiA is 0.1041; (TH1+TH2)/LS is 0.0292.

Please refer to Table 1 and Table 2 in the following.

Table 1. Data of the lenses of the first optical embodiment

TABLE 1

Data of the lenses of the first optical embodiment
f = 4.075 mm; f/HEP = 1.4; HAF = 50.000 deg

| Surface | | Curvature Radius | Thickness (mm) | Material |
|---|---|---|---|---|
| 0 | Object | Plano | Plano | |
| 1 | Lens 1 | −40.99625704 | 1.934 | Plastic |
| 2 | | 4.555209289 | 5.923 | |
| 3 | Aperture | Plano | 0.495 | |
| 4 | Lens 2 | 5.333427366 | 2.486 | Plastic |
| 5 | | −6.781659971 | 0.502 | |
| 6 | Lens 3 | −5.697794287 | 0.380 | Plastic |
| 7 | | −8.883957518 | 0.401 | |
| 8 | Lens 4 | 13.19225664 | 1.236 | Plastic |
| 9 | | 21.55681832 | 0.025 | |
| 10 | Lens 5 | 8.987806345 | 1.072 | Plastic |
| 11 | | −3.158875374 | 0.025 | |
| 12 | Lens 6 | −29.46491425 | 1.031 | Plastic |
| 13 | | 3.593484273 | 2.412 | |
| 14 | IR-cut filter | Plano | 0.200 | |
| 15 | | Plano | 1.420 | |
| 16 | Image plane | Plano | | |

| Surface | Refractive index | Dispersion coefficient | Focal length |
|---|---|---|---|
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |
| 14 | 1.517 | 64.13 | |
| 15 | | | |
| 16 | | | |

Reference wavelength = 555 nm; Shield position: The clear aperture of the first surface is 5.800 mm. The clear aperture of the third surface is 1.570 mm. The clear aperture of the fifth surface is 1.950 mm.

Table 2. The aspheric surface parameters of the first optical embodiment

TABLE 2

Aspheric Coefficients

| | Surface | | | |
|---|---|---|---|---|
| | 1 | 2 | 4 | 5 |
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |
| A6 | −5.233264E−04 | −1.502232E−04 | −1.838068E−03 | −3.657520E−03 |
| A8 | 3.077890E−05 | −1.359611E−04 | 1.233332E−03 | −1.131622E−03 |
| A10 | −1.260650E−06 | 2.680747E−05 | −2.390895E−03 | 1.390351E−03 |
| A12 | 3.319093E−08 | −2.017491E−06 | 1.998555E−03 | −4.152857E−04 |
| A14 | −5.051600E−10 | 6.604615E−08 | −9.734019E−04 | 5.487286E−05 |
| A16 | 3.380000E−12 | −1.301630E−09 | 2.478373E−04 | −2.919339E−06 |

| | Surface | | | |
|---|---|---|---|---|
| | 6 | 7 | 8 | 9 |
| k | 5.645686E+00 | −2.117147E+01 | −5.287220E+00 | 6.200000E+01 |
| A4 | −3.379055E−03 | −1.370959E−02 | −2.937377E−02 | −1.359965E−01 |
| A6 | −1.225453E−03 | 6.250200E−03 | 2.743532E−03 | 6.628518E−02 |
| A8 | −5.979572E−03 | −5.854426E−03 | −2.457574E−03 | −2.129167E−02 |
| A10 | 4.556449E−03 | 4.049451E−03 | 1.874319E−03 | 4.396344E−03 |
| A12 | −1.177175E−03 | −1.314592E−03 | −6.013661E−04 | −5.542899E−04 |
| A14 | 1.370522E−04 | 2.143097E−04 | 8.792480E−05 | 3.768879E−05 |
| A16 | −5.974015E−06 | −1.399894E−05 | −4.770527E−06 | −1.052467E−06 |

| | Surface | | | |
|---|---|---|---|---|
| | 10 | 11 | 12 | 13 |
| k | −2.114008E+01 | −7.699904E+00 | −6.155476E+01 | −3.120467E−01 |
| A4 | −1.263831E−01 | −1.927804E−02 | −2.492467E−02 | −3.521844E−02 |
| A6 | 6.965399E−02 | 2.478376E−03 | −1.835360E−03 | 5.629654E−03 |
| A8 | −2.116027E−02 | 1.438785E−03 | 3.201343E−03 | −5.466925E−04 |
| A10 | 3.819371E−03 | −7.013749E−04 | −8.990757E−04 | 2.231154E−05 |
| A12 | −4.040283E−04 | 1.253214E−04 | 1.245343E−04 | 5.548990E−07 |
| A14 | 2.280473E−05 | −9.943196E−06 | −8.788363E−06 | −9.396920E−08 |
| A16 | −5.165452E−07 | 2.898397E−07 | 2.494302E−07 | 2.728360E−09 |

The values related to arc lengths may be obtained according to Table 1 and Table 2.

| First optical embodiment (Reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |
| ARS | EHD | ARS value | ARS − EHD | (ARS/EHD) % | TP | ARS/TP (%) |
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first optical embodiment, wherein the unit of the curvature radius, the thickness, the distance, and the focal length is millimeters (mm). Surface 0-16 illustrate the surfaces from the object side to the image side. Table 2 is the aspheric coefficients of the first optical embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in Table 1 and Table 2 for the first optical embodiment. Therefore, similar description shall not be illustrated again. Furthermore, the definitions of element parameters in each of the embodiments are the same as those in the first optical embodiment.

The Second Optical Embodiment

Figure 15:
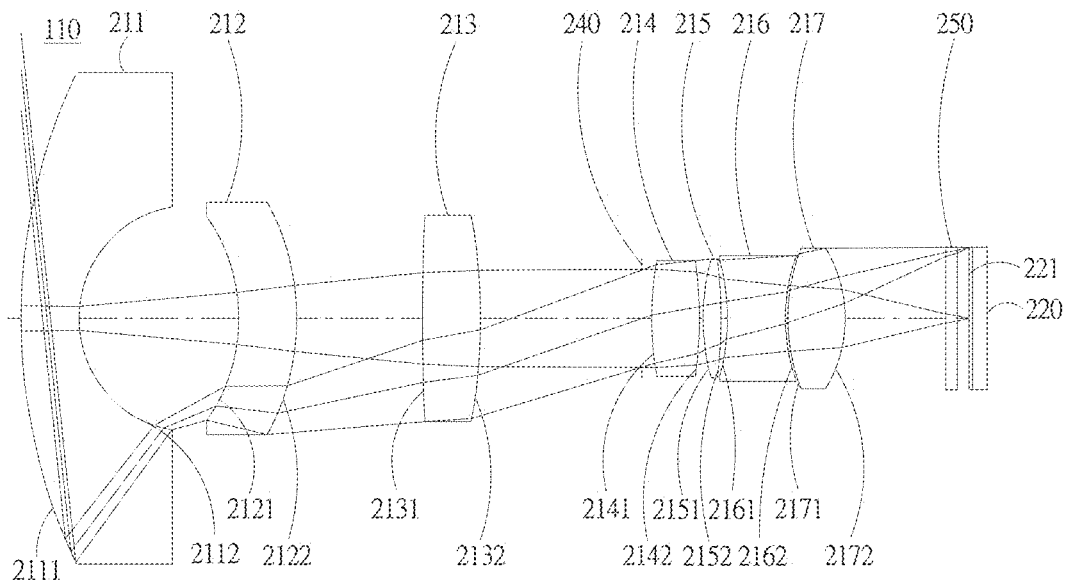
FIG. 15 depicts a configuration diagram of the lens assembly of the camera unit according to the second optical embodiment of the present invention.
Figure 16:
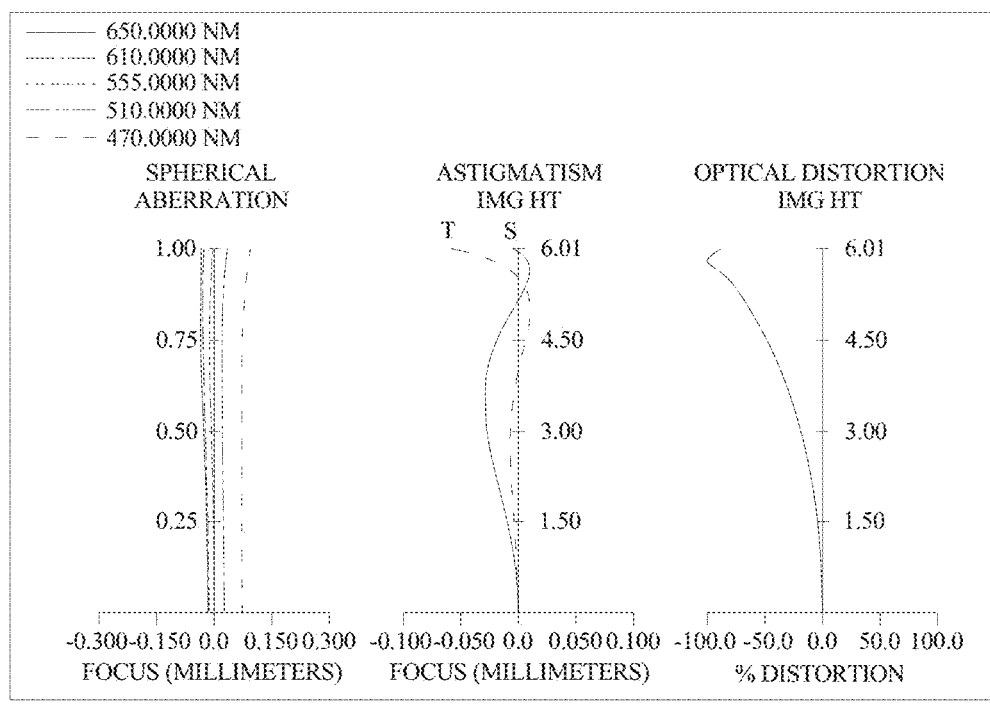
FIG. 16 depicts a curve diagram of the spherical aberration, astigmatism, and optical distortion illustrated sequentially from the left to the right according to the second optical embodiment of the present invention.

Please refer to FIG. 15 and FIG. 16. FIG. 15 depicts a configuration diagram of the lens assembly of the camera unit according to the second optical embodiment of the present invention. FIG. 16 depicts a curve diagram of the spherical aberration, astigmatism, and optical distortion illustrated sequentially from the left to the right according to the second optical embodiment of the present invention. As shown in FIG. 15, the camera unit includes a first lens 11, a second lens 12, a third lens 13, an aperture 40, a four lens 14, a fifth lens 15, a sixth lens 16, a seventh lens 17, an IR-cut filter 50, an image plane 21, and image sensor elements 20 sequentially displayed from an object side to an image side.

Please refer to the following Table 3.

Table 3. Data of the lens of the second optical embodiment

TABLE 3

Data of the lenses of the second optical embodiment
f = 4.7601 mm; f/HEP = 2.2; HAF = 95.98 deg

| Surface | | Curvature Radius | Thickness(mm) | Material |
|---|---|---|---|---|
| 0 | Object | 1E+18 | 1E+18 | |
| 1 | Lens 1 | 47.71478323 | 4.977 | Glass |
| 2 | | 9.527614761 | 13.737 | |
| 3 | Lens 2 | −14.88061107 | 5.000 | Glass |
| 4 | | −20.42046946 | 10.837 | |
| 5 | Lens 3 | 182.4762997 | 5.000 | Glass |
| 6 | | −46.71963608 | 13.902 | |
| 7 | Aperture | 1E+18 | 0.850 | |
| 8 | Lens 4 | 28.60018103 | 4.095 | Glass |
| 9 | | −35.08507586 | 0.323 | |
| 10 | Lens 5 | 18.25991342 | 1.539 | Glass |
| 11 | | −36.99028878 | 0.546 | |
| 12 | Lens 6 | −18.24574524 | 5.000 | Glass |
| 13 | | 15.33897192 | 0.215 | |
| 14 | Lens 7 | 16.13218937 | 4.933 | Glass |
| 15 | | −11.24007 | 8.664 | |
| 16 | IR-cut filter | 1E+18 | 1.000 | BK_7 |
| 17 | | 1E+18 | 1.007 | |
| 18 | Image plane | 1E+18 | −0.007 | |

Data of the optical image capturing module of the second optical embodiment
f = 4.7601 mm; f/HEP = 2.2; HAF = 95.98 deg

| Surface | Refractive index | Dispersion coefficient | Focal length |
|---|---|---|---|
| 0 | | | |
| 1 | 2.001 | 29.13 | −12.647 |
| 2 | | | |
| 3 | 2.001 | 29.13 | −99.541 |
| 4 | | | |
| 5 | 1.847 | 23.78 | 44.046 |
| 6 | | | |

TABLE 3-continued

| | | | |
|---|---|---|---|
| 7 | | | |
| 8 | 1.834 | 37.35 | 19.369 |
| 9 | | | |
| 10 | 1.609 | 46.44 | 20.223 |
| 11 | | | |
| 12 | 2.002 | 19.32 | −7.668 |
| 13 | | | |
| 14 | 1.517 | 64.20 | 13.620 |
| 15 | | | |
| 16 | 1.517 | 64.2 | |
| 17 | | | |
| 18 | | | |

Reference wavelength (d-line) = 555 nm
Reference Wavelength = 555 nm

The values stated as follows may be deduced according to Table 3.

| The second optical embodiment (Primary reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.3764 | 0.0478 | 0.1081 | 0.2458 | 0.2354 | 0.6208 |
| \|f/f7\| | ΣPPR | ΣNPR | ΣPPR/\|ΣNPR\| | IN12/f | IN67/f |
| 0.3495 | 1.3510 | 0.6327 | 2.1352 | 2.8858 | 0.0451 |
| \|f1/f2\| | \|f2/f3\| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PhiA | PhiC | PhiD | TH1 | TH2 | HOI |
| 11.962 mm | 12.362 mm | 12.862 mm | 0.25 mm | 0.2 mm | 6 mm |
| PhiA/PhiD | TH1 + TH2 | (TH1 + TH2)/HOI | (TH1 + TH2)/HOS | 2(TH1 + TH2)/PhiA | InTL/HOS |
| 0.9676 | 0.45 mm | 0.075 | 0.0055 | 0.0752 | 0.8693 |
| PSTA | PLTA | NSTA | NLTA | SSTA | SLTA |
| 0.060 mm | −0.005 mm | 0.016 mm | 0.006 mm | 0.020 mm | −0.008 mm |

The values stated as follows may be deduced according to Table 3.

| The second optical embodiment (Primary reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |

| ARS | EHD | ARS value | ARS − EHD | (ARS/EHD) % | TP | ARS/TP (%) |
|---|---|---|---|---|---|---|
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |

-continued

| The second optical embodiment (Primary reference wavelength: 555 nm) | | | | | |
|---|---|---|---|---|---|
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The values stated as follows may be deduced according to Table 3.

| Related inflection point values of second optical embodiment (Primary reference wavelength: 555 nm) | | | | | | | |
|---|---|---|---|---|---|---|---|
| HIF111 | 0 | HIF111/HOI | 0 | SGI111 | 0 | \|SGI111\|/(\|SGI111\| + TP1) | 0 |

The Third Optical Embodiment

Figure 17:
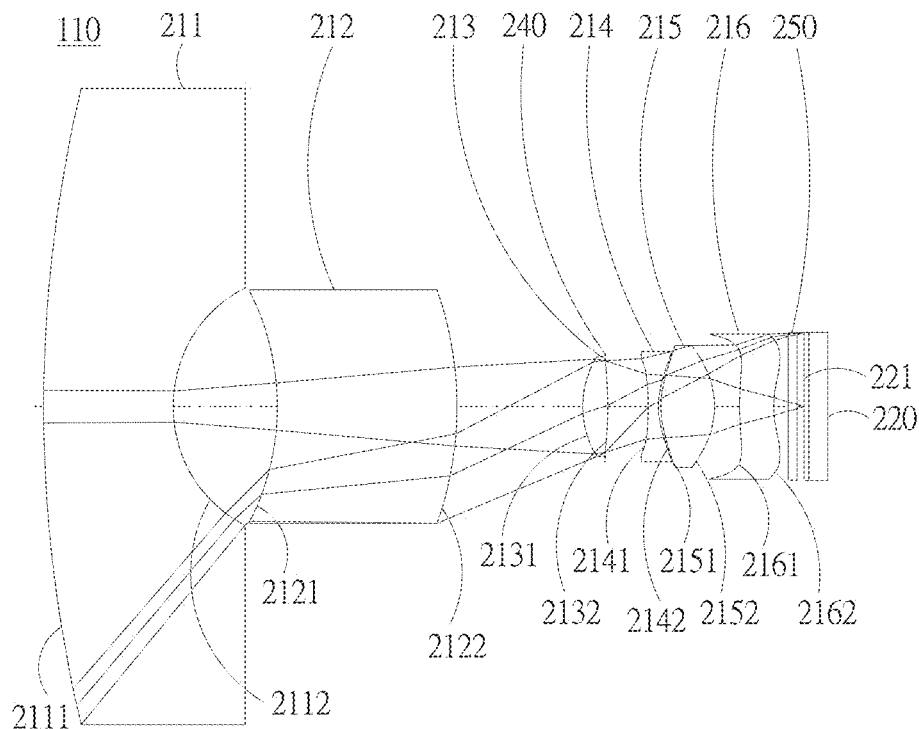
FIG. 17 depicts a configuration diagram of the lens assembly of the camera unit according to the third optical embodiment of the present invention.
Figure 18:
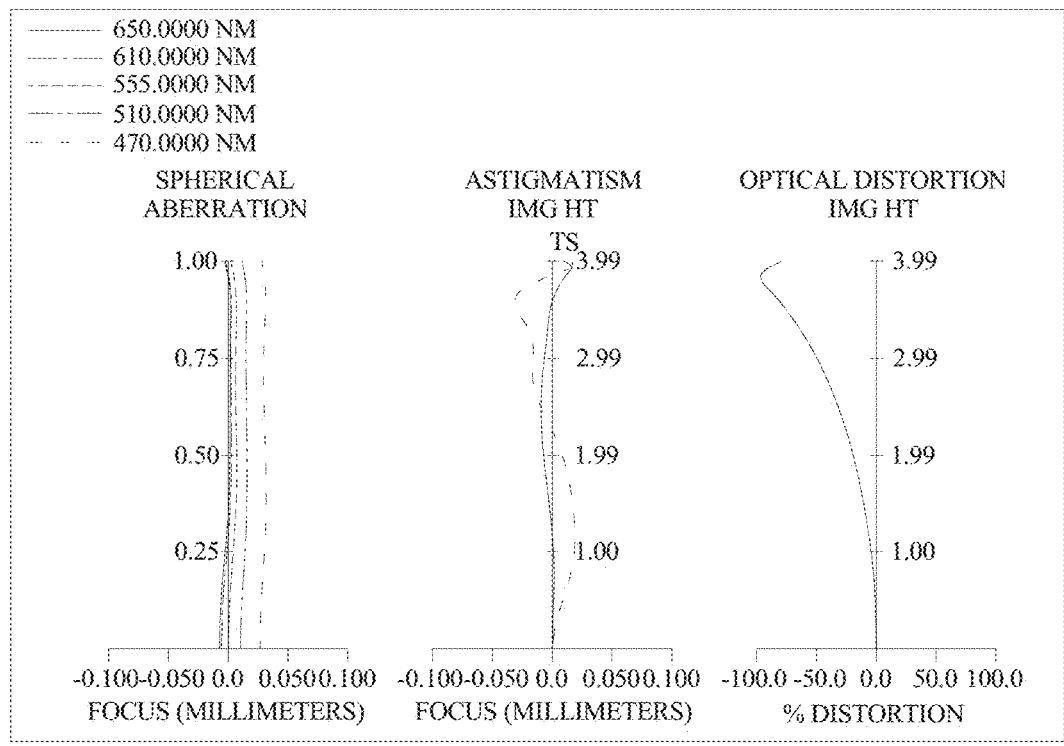
FIG. 18 depicts a curve diagram of the spherical aberration, astigmatism, and optical distortion illustrated sequentially from the left to the right according to the third optical embodiment of the present invention.

Please refer to FIG. 17 and FIG. 18. FIG. 17 depicts a configuration diagram of the lens assembly of the camera unit according to the third optical embodiment of the present invention. FIG. 18 depicts a curve diagram of the spherical aberration, astigmatism, and optical distortion illustrated sequentially from the left to the right according to the third optical embodiment of the present invention. As shown in FIG. 17, the camera unit includes a first lens 11, a second lens 12, a third lens 13, an aperture 40, a four lens 14, a fifth lens 15, a sixth lens 16, an IR-cut filter 50, an image plane 21, and image sensor elements 20 sequentially displayed from an object side to an image side.

Please refer to the following Table 4 and Table 5.

Table 4. Data of the lenses of the third optical embodiment

TABLE 4

| Data of the lenses of the third optical embodiment f = 2.808 mm; f/HEP = 1.6; HAF = 100 deg | | | | |
|---|---|---|---|---|
| Surface | | Curvature radius | Thickness (mm) | Material |
| 0 | Object | 1E+18 | 1E+18 | |
| 1 | Lens 1 | 71.398124 | 7.214 | Glass |
| 2 | | 7.117272355 | 5.788 | |
| 3 | Lens 2 | −13.29213699 | 10.000 | Glass |
| 4 | | −18.37509887 | 7.005 | |
| 5 | Lens 3 | 5.039114804 | 1.398 | Plastic |
| 6 | | −15.53136631 | −0.140 | |
| 7 | Aperture | 1E+18 | 2.378 | |
| 8 | Lens 4 | −18.68613609 | 0.577 | Plastic |
| 9 | | 4.086545927 | 0.141 | |
| 10 | Lens 5 | 4.927609282 | 2.974 | Plastic |
| 11 | | −4.551946605 | 1.389 | |
| 12 | Lens 6 | 9.184876531 | 1.916 | Plastic |
| 13 | | 4.845500046 | 0.800 | |
| 14 | IR-cut filter | 1E+18 | 0.500 | BK_7 |
| 15 | | 1E+18 | 0.371 | |
| 16 | image plane | 1E+18 | 0.005 | |

| Data of the optical image capturing module of the third optical embodiment f = 2.808 mm; f/HEP = 1.6; HAF = 100 deg | | | |
|---|---|---|---|
| Surface | Refractive Index | Dispersion coefficient | Focal length |
| 0 | | | |
| 1 | 1.702 | 41.15 | −11.765 |
| 2 | | | |
| 3 | 2.003 | 19.32 | −4537.460 |
| 4 | | | |
| 5 | 1.514 | 56.80 | 7.553 |
| 6 | | | |
| 7 | | | |
| 8 | 1.661 | 20.40 | −4.978 |
| 9 | | | |
| 10 | 1.565 | 58.00 | 4.709 |
| 11 | | | |
| 12 | 1.514 | 56.80 | −23.405 |
| 13 | | | |
| 14 | 1.517 | 64.13 | |
| 15 | | | |
| 16 | | | |

Reference wavelength (d-line) = 555 nm

Table 5. The aspheric surface parameters of the third optical embodiment

TABLE 5

Aspheric Coefficients

| | Surface No | | | |
|---|---|---|---|---|
| | 1 | 2 | 3 | 4 |
| k | 0.000000E+00 | 0.000000E+00 | 0.000000E+00 | 0.000000E+00 |
| A4 | 0.000000E+00 | 0.000000E+00 | 0.000000E+00 | 0.000000E+00 |
| A6 | 0.000000E+00 | 0.000000E+00 | 0.000000E+00 | 0.000000E+00 |
| A8 | 0.000000E+00 | 0.000000E+00 | 0.000000E+00 | 0.000000E+00 |
| A10 | 0.000000E+00 | 0.000000E+00 | 0.000000E+00 | 0.000000E+00 |

| | Surface No | | | |
|---|---|---|---|---|
| | 5 | 6 | 8 | 9 |
| k | 1.318519E−01 | 3.120384E+00 | −1494442E+01 | 2.744228E−02 |
| A4 | 6.405246E−05 | 2.103942E−03 | −1.598286E−03 | −7.291825E−03 |
| A6 | 2.278341E−05 | −1.050629E−04 | −9.177115E−04 | 9.730714E−05 |
| A8 | −3.672908E−06 | 6.168906E−06 | 1.011405E−04 | 1.101816E−06 |
| A10 | 3.748457E−07 | −1.224682E−07 | −4.919835E−06 | −6.849076E−07 |

| | Surface No | | | |
|---|---|---|---|---|
| | 10 | 11 | 12 | 13 |
| k | −7.864013E+00 | −2.263702E+00 | −4.206923E+01 | −7.030803E+00 |
| A4 | 1.405243E−04 | −3.919567E−03 | −1.679499E−03 | −2.640099E−03 |
| A6 | 1.837602E−04 | 2.683449E−04 | −3.518520E−04 | −4.507651E−05 |
| A8 | −2.173368E−05 | −1.229452E−05 | 5.047353E−05 | −2.600391E−05 |
| A10 | 7.328496E−07 | 4.222621E−07 | −3.851055E−06 | 1.161811E−06 |

The values stated as follows may be deduced according to Table 4 and Table 5.

| Third optical embodiment (Primary reference wavelength: 555 nm) | | | | | |
|---|---|---|---|---|---|
| \| f/f1 \| | \| f/f2 \| | \| f/f3 \| | \| f/f4 \| | \| f/f5 \| | \| f/f6 \| |
| 0.23865 | 0.00062 | 0.37172 | 0.56396 | 0.59621 | 0.11996 |
| ΣPPR | ΣNPR | ΣPPR/ΣNPR | IN12/f | IN56/f | TP4/(IN34 + TP4 + IN45) |
| 1.77054 | 0.12058 | 14.68400 | 2.06169 | 0.49464 | 0.19512 |
| \| f1/f2 \| | \| f2/f3 \| | (TP1 + IN12)/TP2 | | (TP6 + IN56)/TP5 | |
| 0.00259 | 600.74778 | 1.30023 | | 1.11131 | |
| HOS | InTL | HOS/HOI | InS/HOS | ODT % | TDT % |
| 42.31580 | 40.63970 | 10.57895 | 0.26115 | −122.32700 | 93.33510 |
| HVT51 | HVT52 | HVT61 | HVT62 | HVT62/HOI | HVT62/HOS |
| 0 | 0 | 2.22299 | 2.60561 | 0.65140 | 0.06158 |
| TP2/TP3 | TP3/TP4 | InRS61 | InRS62 | \| InRS61 \|/TP6 | \| InRS62 \|/TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |
| PhiA/PhiD | TH1 + TH2 | (TH1 + TH2)/HOI | (TH1 + TH2)/HOS | 2(TH1 + H2)/PhiA | InTL/HOS |
| 0.9165 | 0.28 mm | 0.07 | 0.0066 | 0.0911 | 0.9604 |
| PSTA | PLTA | NSTA | NLTA | SSTA | SLTA |
| 0.014 mm | 0.002 mm | −0.003 mm | −0.002 mm | 0.011 mm | −0.001 mm |

The values related to arc lengths may be obtained according to table 4 and table 5.

| Third optical embodiment (Reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |

| Third optical embodiment (Reference wavelength = 555 nm) | | | | | | |
|---|---|---|---|---|---|---|
| ARS | EHD | ARS value | ARS − EHD | (ARS/EHD) % | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The values stated as follows may be deduced according to Table 4 and Table 5.

| Related inflection point values of third optical embodiment (Primary reference wavelength: 555 nm) | | | | | | |
|---|---|---|---|---|---|---|
| HIF321 | 2.0367 | HIF321/HOI | 0.5092 | SGI321 | −0.1056 | |SGI321|/(|SGI321| + TP3) | 0.0702 |
| HIF421 | 2.4635 | HIF421/HOI | 0.6159 | SGI421 | 0.5780 | |SGI421|/(|SGI421| + TP4) | 0.5005 |
| HIF611 | 1.2364 | HIF611/HOI | 0.3091 | SGI611 | 0.0668 | |SGI611|/(|SGI611| + TP6) | 0.0337 |
| HIF621 | 1.5488 | HIF621/HOI | 0.3872 | SGI621 | 0.2014 | |SGI621|/(|SGI621| + TP6) | 0.0951 |

The Fourth Optical Embodiment

Figure 19:
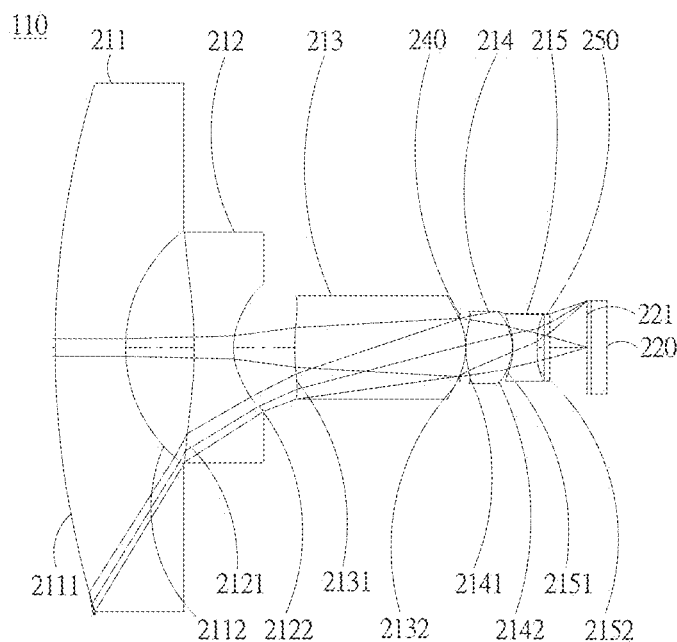
FIG. 19 depicts a configuration diagram of the lens assembly of the camera unit according to the fourth optical embodiment of the present invention.
Figure 20:
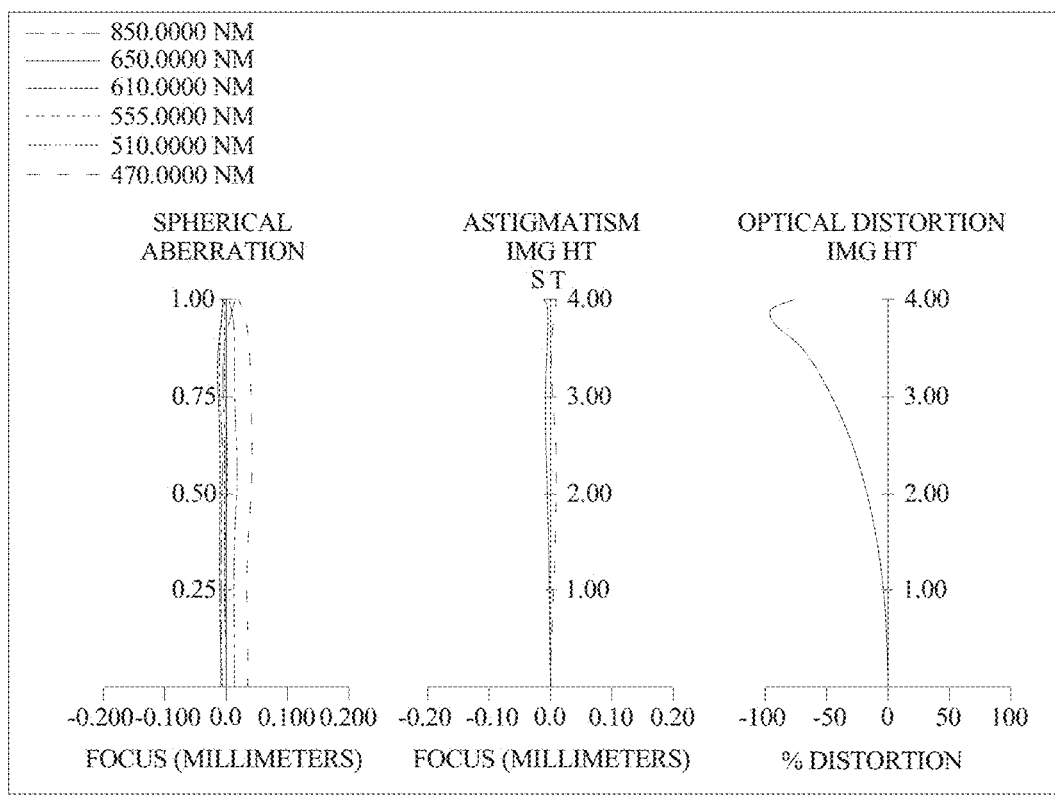
FIG. 20 depicts a curve diagram of the spherical aberration, astigmatism, and optical distortion illustrated sequentially from the left to the right according to the fourth optical embodiment of the present invention.

Please refer to FIG. 19 and FIG. 20. FIG. 19 depicts a configuration diagram of the lens assembly of the camera unit according to the fourth optical embodiment of the present invention. FIG. 20 depicts a curve diagram of the spherical aberration, astigmatism, and optical distortion illustrated sequentially from the left to the right according to the fourth optical embodiment of the present invention. As shown in FIG. 19, the camera unit includes a first lens 11, a second lens 12, a third lens 13, an aperture 40, a four lens 14, a fifth lens 15, a sixth lens 16, an IR-cut filter 50, an image plane 21, and image sensor elements 20 sequentially displayed from an object side to an image side.

Please refer to the following Table 6 and Table 7.

Table 6. Data of the lenses of the fourth optical embodiment

TABLE 6

| Data of the lenses of the fourth optical embodiment f = 2.7883 mm; f/HEP = 1.8; HAF = 101 deg | | | |
|---|---|---|---|
| Surface | Curvature radius | Thickness(mm) | Material |
| 0 | Object | 1E+18 | 1E+18 | |
| 1 | Lens 1 | 76.84219 | 6.117399 | Glass |
| 2 | | 12.62555 | 5.924382 | |
| 3 | Lens 2 | −37.0327 | 3.429817 | Plastic |
| 4 | | 5.88556 | 5.305191 | |
| 5 | Lens 3 | 17.99395 | 14.79391 | |
| 6 | | −5.76903 | −0.4855 | Plastic |
| 7 | Aperture | 1E+18 | 0.535498 | |
| 8 | Lens 4 | 8.19404 | 4.011739 | Plastic |
| 9 | | −3.84363 | 0.050366 | |
| 10 | Lens 5 | −4.34991 | 2.088275 | Plastic |
| 11 | | 16.6609 | 0.6 | |
| 12 | IR-cut filter | 1E+18 | 0.5 | BK_7 |

TABLE 6-continued

| | | | |
|---|---|---|---|
| 13 | | 1E+18 | 3.254927 |
| 14 | Image plane | 1E+18 | −0.00013 |

Data of the optical image capturing module of the fourth optical embodiment
f = 2.7883 mm; f/HEP = 1.8; HAF = 101 deg

| Surface | Refractive index | Dispersion coefficient | Focal length |
|---|---|---|---|
| 0 | | | |
| 1 | 1.497 | 81.61 | −31.322 |
| 2 | | | |
| 3 | 1.565 | 54.5 | −8.70843 |
| 4 | | | |
| 5 | | | |
| 6 | 1.565 | 58 | 9.94787 |
| 7 | | | |
| 8 | 1.565 | 58 | 5.24898 |
| 9 | | | |
| 10 | 1.661 | 20.4 | −4.97515 |
| 11 | | | |
| 12 | 1.517 | 64.13 | |
| 13 | | | |
| 14 | | | |

Reference wavelength(d-line) = 555 nm

Table 7. The aspheric surface parameters of the fourth optical embodiment

TABLE 7

Aspheric Coefficients

| | Surface | | | |
|---|---|---|---|---|
| | 1 | 2 | 3 | 4 |
| k | 0.000000E+00 | 0.000000E+00 | 0.131249 | −0.069541 |
| A4 | 0.000000E+00 | 0.000000E+00 | 3.99823E−05 | −8.55712E−04 |
| A6 | 0.000000E+00 | 0.000000E+00 | 9.03636E−08 | −1.96175E−06 |
| A8 | 0.000000E+00 | 0.000000E+00 | 1.91025E−09 | −1.39344E−08 |
| A10 | 0.000000E+00 | 0.000000E+00 | −1.18567E−11 | −4.17090E−09 |
| A12 | 0.000000E+00 | 0.000000E+00 | 0.000000E+00 | 0.000000E+00 |

| | Surface | | | |
|---|---|---|---|---|
| | 5 | 6 | 8 | 9 |
| k | −0.324555 | 0.009216 | −0.292346 | −0.18604 |
| A4 | −9.07093E−04 | 8.80963E−04 | −1.02138E−03 | 4.33629E−03 |
| A6 | −1.02465E−05 | 3.14497E−05 | −1.18559E−04 | −2.91588E−04 |
| A8 | −8.18157E−08 | −3.15863E−06 | 1.34404E−05 | 9.11419E−06 |
| A10 | −2.42621E−09 | 1.44613E−07 | −2.80681E−06 | 1.28365E−07 |
| A12 | 0.000000E+00 | 0.000000E+00 | 0.000000E+00 | 0.000000E+00 |

| | Surface | |
|---|---|---|
| | 10 | 11 |
| k | −6.17195 | 27.541383 |
| A4 | 1.58379E−03 | 7.56932E−03 |
| A6 | −1.81549E−04 | −7.83858E−04 |
| A8 | −1.18213E−05 | 4.79120E−05 |
| A10 | 1.92716E−06 | −1.73591E−06 |
| A12 | 0.000000E+00 | 0.000000E+00 |

The values stated as follows may be deduced according to Table 6 and Table 7.

| Fourth optical embodiment (Primary reference wavelength: 555 nm) | | | | | |
|---|---|---|---|---|---|
| \| f/f1 \| | \| f/f2 \| | \| f/f3 \| | \| f/f4 \| | \| f/f5 \| | \| f1/f2 \| |
| 0.08902 | 0.32019 | 0.28029 | 0.53121 | 0.56045 | 3.59674 |

-continued

| Fourth optical embodiment (Primary reference wavelength: 555 nm) | | | | | |
|---|---|---|---|---|---|
| ΣPPR | ΣNPR | ΣPPR/\|ΣNPR\| | IN12/f | IN45/f | \|f2/f3\| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \|InRS51\|/TP5 | \|InRS52\|/TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| PhiA/PhiD | TH1 + TH2 | (TH1 + TH2)/HOI | (TH1 + TH2)/HOS | 2(TH1 + TH2)/PhiA | InTL/HOS |
| 0.9150 | 0.26 mm | 0.065 | 0.0056 | 0.0929 | 0.9056 |
| PSTA | PLTA | NSTA | NLTA | SSTA | SLTA |
| −0.011 mm | 0.005 mm | −0.010 mm | −0.003 mm | 0.005 mm | −0.00026 mm |

The values related to arc lengths may be obtained according to table 6 and table 7.

| Fourth optical embodiment (Reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |

-continued

| Fourth optical embodiment (Reference wavelength = 555 nm) | | | | | | |
|---|---|---|---|---|---|---|
| ARS | EHD | ARS value | ARS − EHD | (ARS/EHD) % | TP | ARS/TP (%) |
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The values stated as follows may be deduced according to Table 6 and Table 7.

| Related inflection point values of fourth optical embodiment (Primary reference wavelength: 555 nm) | | | | | |
|---|---|---|---|---|---|
| HIF211 | 6.3902 | HIF211/HOI | 1.5976 | SGI211 | −0.4793 | \|SGI211\|/(\|SGI211\| + TP2) | 0.1226 |
| HIF311 | 2.1324 | HIF311/HOI | 0.5331 | SGI311 | 0.1069 | \|SGI311\|/(\|SGI311\| + TP3) | 0.0072 |
| HIF411 | 2.0278 | HIF411/HOI | 0.5070 | SGI411 | 0.2287 | \|SGI411\|/(\|SGI411\| + TP4) | 0.0539 |
| HIF511 | 2.6253 | HIF511/HOI | 0.6563 | SGI511 | −0.5681 | \|SGI511\|/(\|SGI511\| + TP5) | 0.2139 |
| HIF512 | 2.1521 | HIF512/HOI | 0.5380 | SGI512 | −0.8314 | \|SGI512\|/(\|SGI512\| + TP5) | 0.2848 |

Hereinafter, the calculation of the glare value of the anti-glare display system of the present invention is to be illustrated in detail.

Example 4

Figure 21:
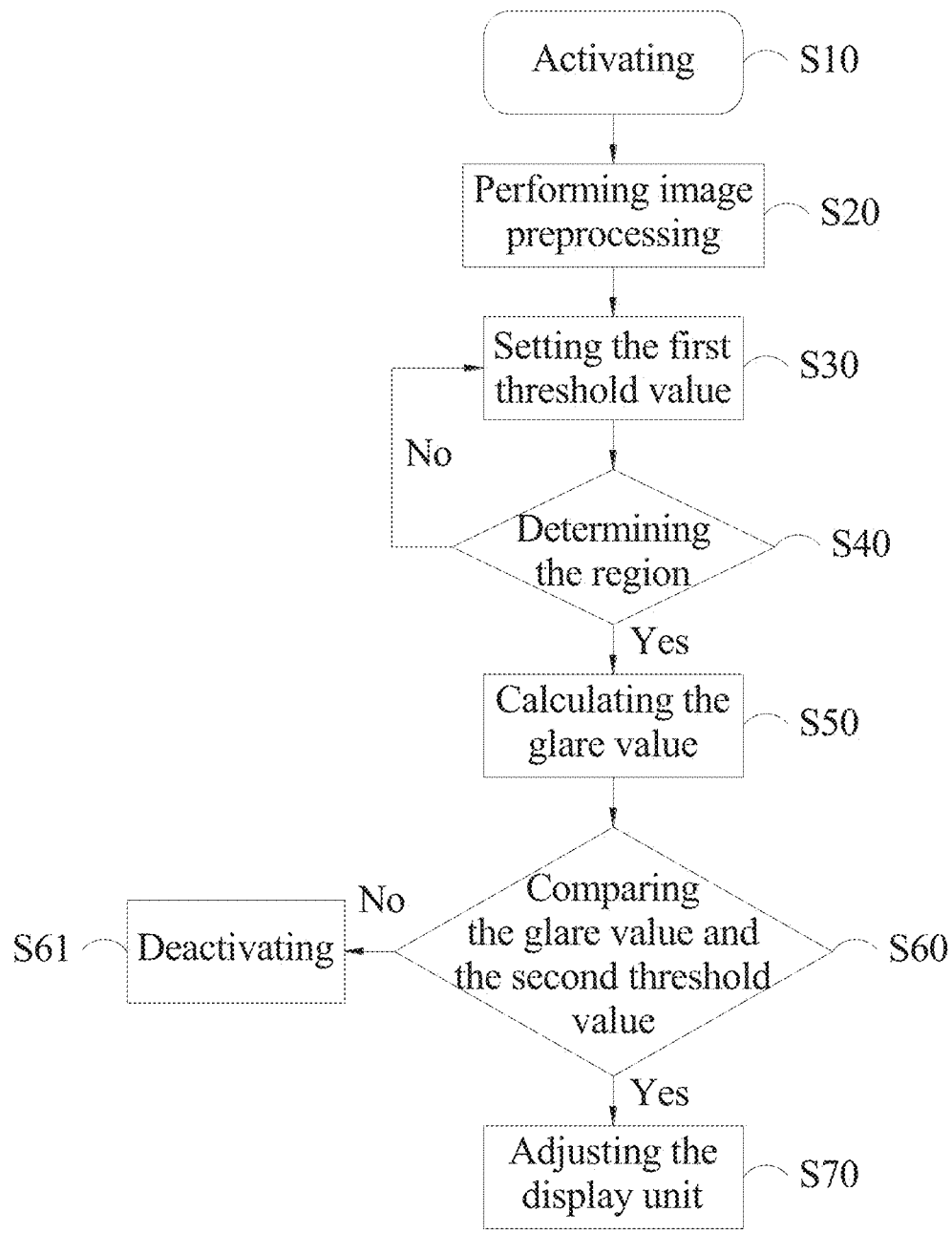
FIG. 21 depicts a flow chart of the calculation of the glare value of the anti-glare display system of the present invention.
Figure 24:
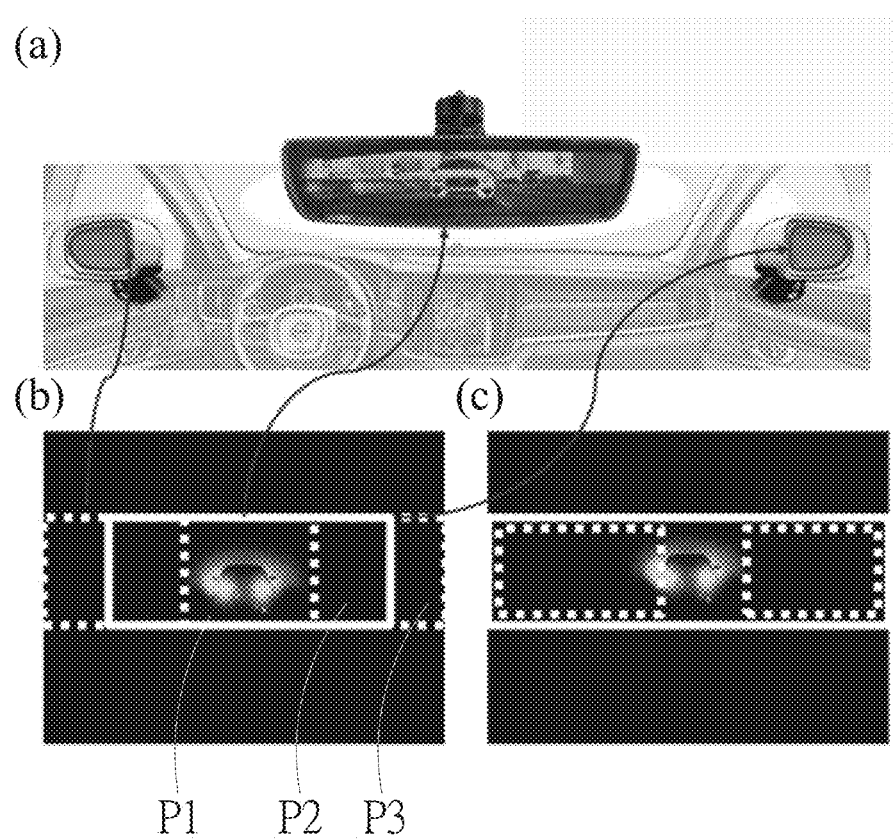
Figure 25:
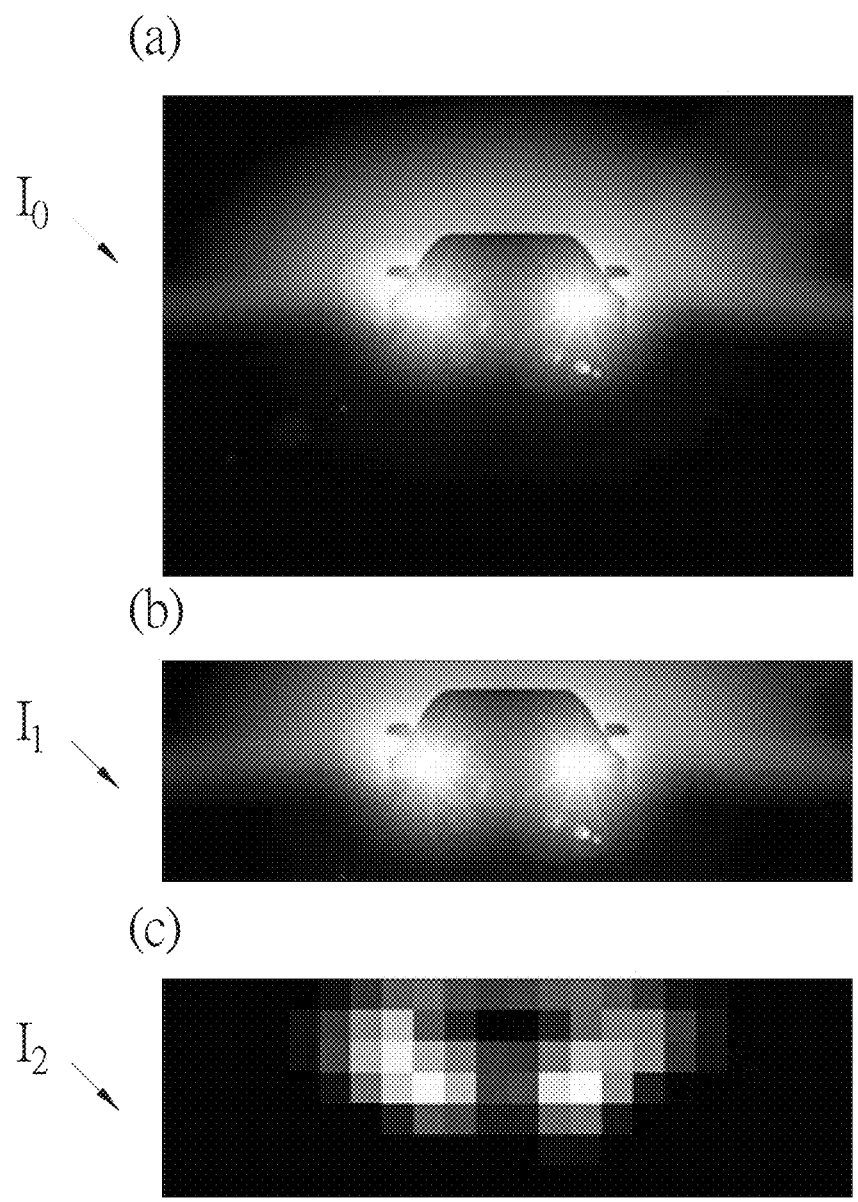

Please refer to FIG. 21 which depicts a flow chart of the calculation of the glare value of the anti-glare display system of the present invention. Please refer to FIG. 22 which depicts an image of Example 4 of the anti-glare display system of the present invention. Please refer to FIGS. 23 to 26 which depict captured schematic diagrams of Example 4 of the anti-glare display system of the present invention. Please refer to FIG. 27 which depicts a compressed array schematic diagram of Example 4 of the anti-glare display system of the present invention. Wherein, FIGS. 22(a), (b), and (c) respectively represent the major image Pm, the region of interest ROI, and the sub-image Pn of the Example 4 of the anti-glare display system of the present invention; FIGS. 25(a), (b), and (c) respectively represent the raw image, the captured image, and the compressed image of Example 4 of the anti-glare display system of the present invention.

In Example 4, the moving device 111 is an automobile, and a camera unit 110 is disposed on the rear windshield of the automobile. The three display units 130 of the first display unit 1301, the second display unit 1302, and the third display unit 1303 respectively replace the left rear-view mirror, the middle rear-view mirror, and the right rear-view minor of the automobile. The first display unit 1301, the second display unit 1302, and the third display unit 130 respectively include an electrochromic element 131, a transflective mirror 132, and a planar display device 133. Wherein, the three display units 130 of the first display unit 1301, the second display unit 1302, and the third display unit 1303 respectively sequentially display the first sub-image P1, the second sub-image P2, and the third sub-image P3.

Figure 22:
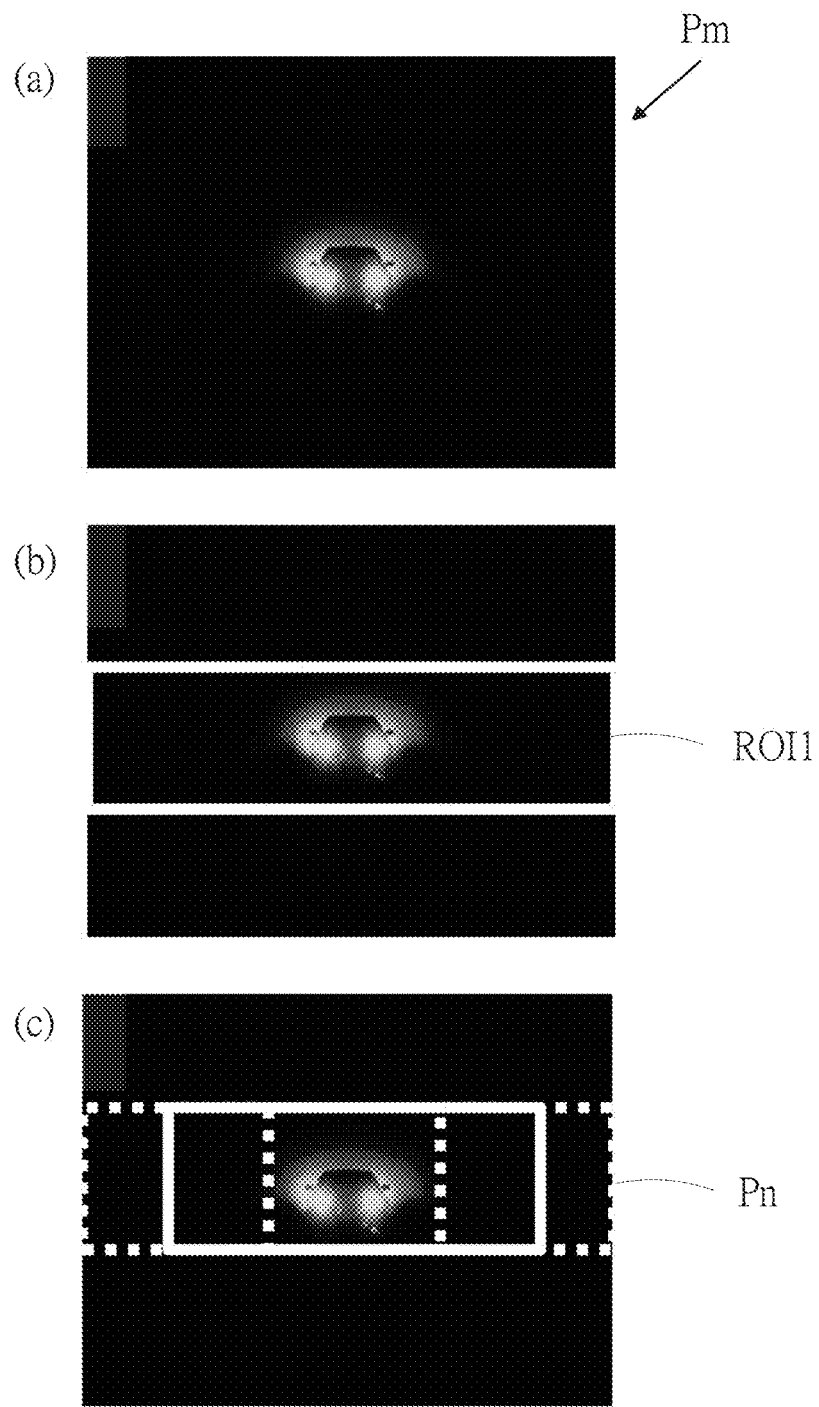
FIG. 22 depicts an image of Example 4 of the anti-glare display system of the present invention.

In step S10, the anti-glare display system of the present invention is activated. With reference to FIG. 22, the camera unit 110 photographs the major image Pm in the opposite direction to the moving direction of the automobile.

In step S20, image preprocessing is performed. A major image Pm is photographed according to the exposure time and the gain setting of the camera unit; in the meantime, the region of interest ROI in the major image Pm is selected according to the height of the user U. The region of interest ROI is divided into sub-images Pn. Then, image compression is performed to reduce resources and time of the processing unit 120 required for calculation of the glare value.

Wherein, when the user U has a higher height, the region of interest ROI is higher in position in the major image Pm to correspond to the eye height of the user U; when the user U has a lower height, the region of interest ROI is lower in position in the major image Pm.

Figure 23:
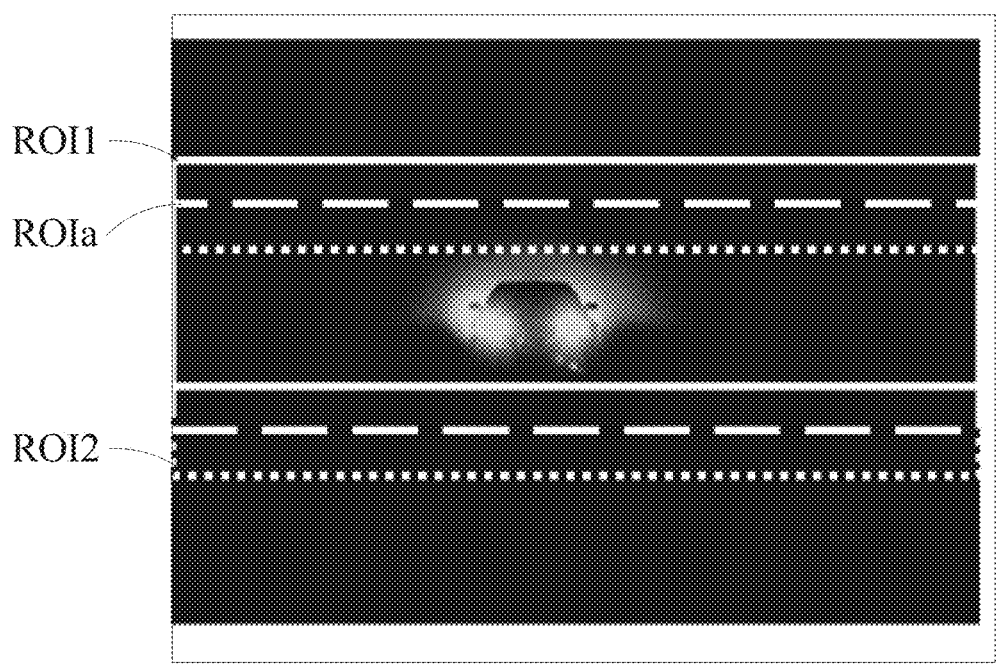
FIGS. 23 to 26 depict captured schematic diagrams of Example 4 of the anti-glare display system of the present invention.

As shown in FIG. 23, any region of interest ROIa may be selected freely in the major image Pm. For instance, when the user U is 180 centimeters tall, the region of interest ROI1 may be selected; when the user U is 160 centimeters tall, the region of interest ROI2 may be selected. As shown in FIG. 24, the sub-image Pn may include all or a portion of the region of interest ROI.

The processing unit 120 electrically connected to the camera unit 110 divides the major image Pm and obtains three sub-images Pn. The three sub-images Pn respectively are the first sub-image P1, the second sub-image P2, and the third sub-image P3, and further select the first sub-image P1 corresponding to the left rear-view mirror as an example of the calculation of the glare value.

FIG. 25(a) depicts an raw image of the first sub-image P1 of Example 4 of the anti-glare display system of the present invention. Wherein, the pixel value of the raw image I0 captured by the camera unit 110 may be changed according to the photographing function of the camera unit 110, such as 1280×720 pixels.

Figure 26:
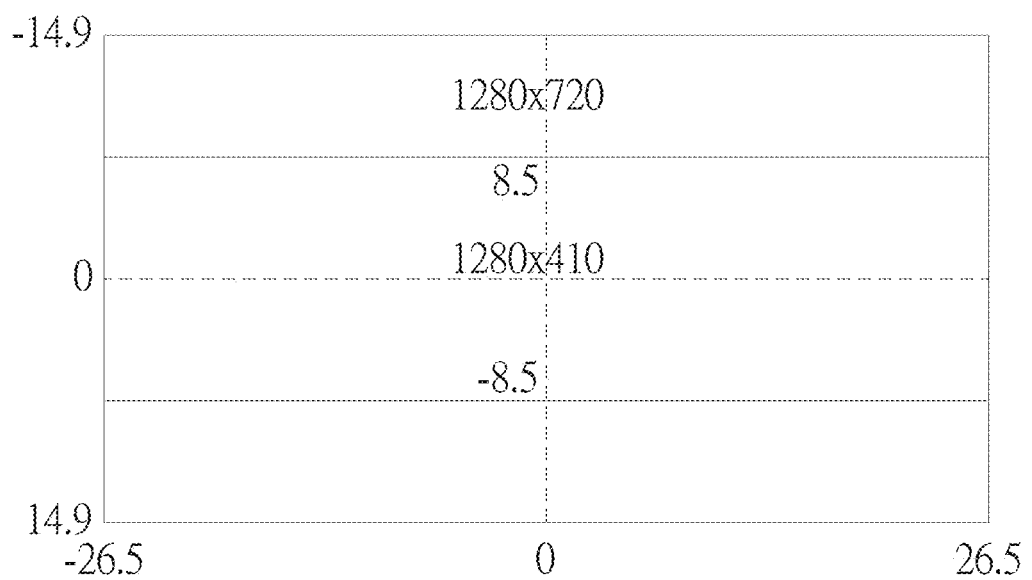

FIG. 25(b) is obtained by using a captured schematic diagram shown in FIG. 26 to perform image capturing on the image shown in FIG. 25(a). As shown, only the middle portion of the raw image I0 is captured to obtain the captured image I1. For instance, only the middle portion of an image with 1280×720 pixels is captured to obtain a captured image I1 with 1280×410 pixel array.

Figure 27:
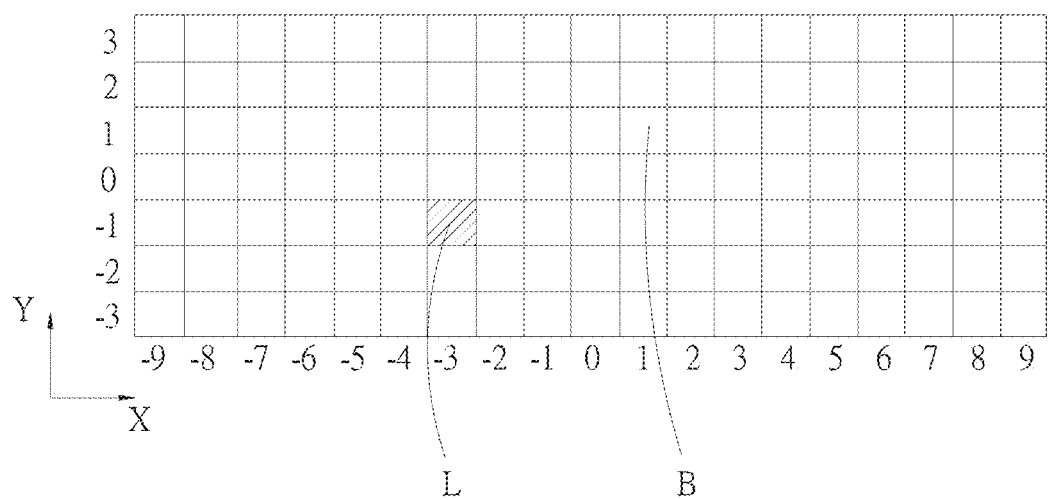
FIG. 27 depicts a compressed array schematic diagram of Example 4 of the anti-glare display system of the present invention.

FIG. 25(c) is obtained by using a compressed array schematic diagram as shown in FIG. 27 to perform image compression on the image as shown in FIG. 25(b). The captured image I1 is remade as a compressed image I2 with lower resolution. For instance, a block base is defined as 65×58 pixels/a block. Therefore, the captured image I1 with a higher resolution 1280×410 pixel array is compressed into the compressed image I2 with a lower resolution 19×7 pixel array; wherein, the compression method is to divide 1280 pixels by 68 to obtain 19 pixels and to divide 410 pixels by 58 to obtain 7 pixels.

In step S30, according to the exposure time and the gain setting described in step S20, the default first threshold value is adjusted to rapidly preliminary determine the glare source and the ambient light source in the compressed image I2. That is, a spatial domain is defined in the region of interest ROI. The method of defining a spatial domain includes, but not is not limited to, finding the glare region L in the compressed image I2 with a brightness value greater than the first threshold value, which may be used for calculation of glare. The region of deducting the compressed image I2 of the glare region is defined as an ambient light region B, which may be used for calculation of ambient light. For instance, when the region of the compressed image I2 is divided into 255 levels according to the brightness from dark to bright, then the first threshold value may be defined as 150, the region where the brightness is greater than or equal to 150 is the glare region L, and the region where the brightness is less than 150 is the ambient light region B. Conversely, the method of defining a spatial domain is to calculate the average brightness of the compressed image I2, define the region of the compressed image I2 with brightness exceeding 1.5 times, 2 times, 2.5 times or more of the average brightness as the glare region L, and define the region of the compressed image I2 of the non-glare region L as the ambient light region B. Wherein, the time domain is defined as 3 frames.

In step S40, it is necessary to determine whether the glare region L and the ambient light region B have been respectively obtained in step S30. If so, proceed to step S50; if not, return to step S30 to obtain the glare region L and the ambient light region B. For instance, when no region in the compressed image I2 is greater than or equal to the first threshold value, the first threshold value decreases; when no region is less than the first threshold value, the first threshold value increases.

In step S50, the glare value sNGA is calculated according to the defined glare region L and the ambient light region B. In step S60, the glare value sNGA is compared with the second threshold value. If the glare value sNGA is less than the second threshold value, the anti-glare display system of the present invention is not activated (as shown in step S61);

if the glare value sNGA is greater than the second threshold value, the procedure proceeds to step S70. In step S70, according to the difference between the glare value sNGA and the second threshold value, the microcontroller MCU adjusts the display of the degree of discoloration of the electrochromic element 131 in the first display unit 1301 of the first sub-image P1 with the glare value sNGA being greater than the second threshold value.

Figure 28:
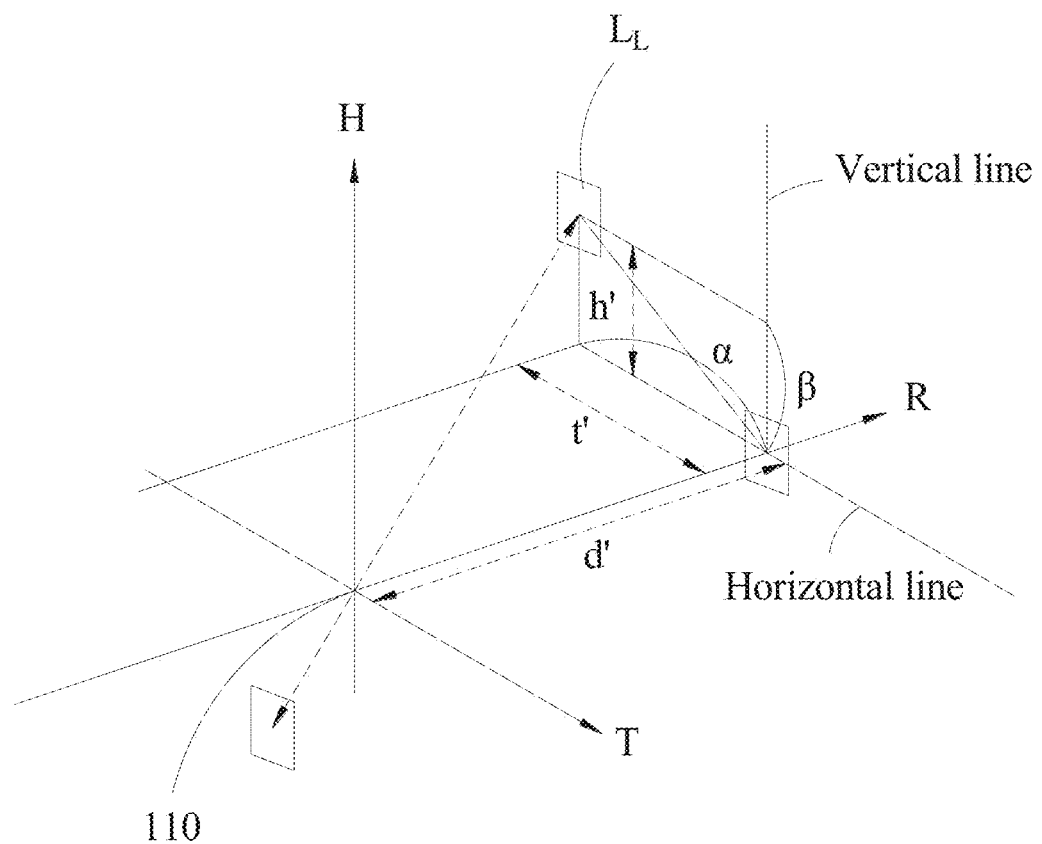
FIGS. 28 and 29 depict projected-relational coordinate diagrams of the glare value of the anti-glare display system of the present invention.
Figure 29:
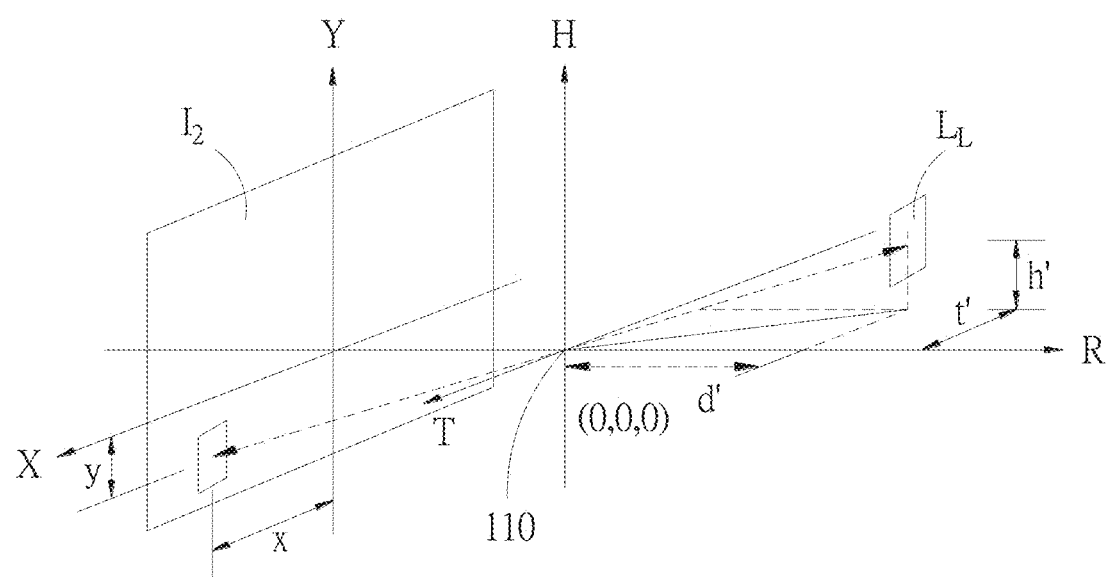

Wherein, the method for calculating the glare value sNGA is presented as follows:

Please refer to FIGS. 28 and 29 which respectively depict projected-relational coordinate diagrams of the glare value of the anti-glare display system of the present invention.

The glare value sNGA is defined as:

$$sNGA = 8 \cdot \log\left[\frac{1}{4} \cdot \frac{\sum_{i,j \in L} V_L(i,j)^2 \cdot Tab_L(i,j)}{\sum_{l,m \in B} V_B(l,m) \cdot Tab_B(l,m)}\right] \quad \text{equation (1)}$$

where, $$Tab_L(i,j) = \frac{|j(t,h; i,j)| \cdot \delta i \cdot \delta j}{Q(t,h)^2 \cdot (1 + t^2 + h^2)};$$

$$Tab_B(l,m) = \frac{|j(t,h; l,m)| \cdot \delta l \cdot \delta m}{(1 + t^2 + h^2)^{\frac{3}{2}}};$$

$t = \tan(\alpha)$; and $h = \tan(\beta)$.

Wherein, as shown in FIGS. 28 and 29, the glare source position parameters are denoted as the projection coordinates of the inverse projection of the pixel coordinates (x, y); the projection coordinates (t', h') respectively are denoted as horizontal and vertical projection coordinate values; the projection coordinates (t, h) are respectively denoted as horizontal and vertical tangent function values; and the reference projection distance is respectively denoted as d'.

Wherein, J(t,h; i,j) and J(t,h; l,m) are Jacobi projection coordinate conversion functions (as shown in FIG. 29) which can be regarded as the functions of pixel coordinates x and y. Therefore, the original coordinates on the T axis, H axis, and R axis may be reversely deduced by the known (x, y) coordinates.

The glare region L corresponds to the glare source $L_L$, and the index (i, j) is the coordinate of the pixels. The ambient light region B corresponds to the ambient light source, and the index (l, m) is the coordinate of the pixels. Wherein, the index (i, j) and the index (l, m) are defined within the range of the image pixel array, and the region of the non-index (l, m) is the region of the index (l, m). This means that the index (i, j) and the index (l, m) constitute the pixel coordinates x and y, and the logarithmic function base is the index region pixel number.

Wherein, $\delta i \cdot \delta j$ and $\delta l \cdot \delta m$ are sampling regions of pixels, which are the sampling regions in a given distance taken by a camera lens (for instance, 5 m); The pixel number projected on the image sensor is related to the horizontal field of view H-FOV. After the optical specification parameters of the camera lens and the sensor are fixed, this number becomes a fixed constant.

To reduce the amount of calculation or speed up the calculation process, the major image may be recalculated as a reproduced image with a lower resolution. For instance, the major image is an array image with 1920×1080 pixels. Selectively, the major image is reproduced into an array image with a low resolution with 19×7 pixels.

$V_L(i, j)$ is the brightness value of the glare source $L_L$ (cd/m$^2$), which corresponds to the brightness of the camera unit 110. $V_B(l, m)$ is the brightness value of the ambient light source (cd/m$^2$), which corresponds to the brightness of the camera unit 110.

The glare source position weighting function Q(t, h) is a weighting function of the position of the glare source $L_L$ in the field of view of an observer. Therefore, the original coordinates on the T axis, H axis, and R axis may be reversely deduced by the known (x, y) coordinates owing to the projection relation.

Based on a physiological assessment of actual use, the observer perceives the most obvious visual impact of the glare source from a distance of 5 m. For the distance >5 m, glare intensity begins to attenuate due to the factor of distance. However, for the distance<5 m, owing to the factor of angle observation, the glare source gradually disappears from the edge of the field of view, and the sensitivity gradually attenuate. Therefore, based on the glare source with the distance of d'=5 m, a glare source position weighting function Q(t, h) may be established.

For the observer, the brightness of the glare source has different sensitivities in different positions in the field of view. The sensitivity distribution relation may be measured according to the following measurement method.

Please refer to FIG. 28. First of all, a standard light source with a viewing angle being 0.1°, lit with a constant brightness, is set on a plane which is 5 m away from the observer for a simulation of a glare source. Under the condition that the background brightness is set to 34 cd/m$^2$, a light source to be tested is set to simulate a glare source. The light source to be tested is lit at a certain distance from the standard light source, and the brightness is adjusted. When the observer looks straight at the standard light source, the light source intensity to be tested in peripheral vision is observed. Moreover, when the light source intensity to be tested is the same as the standard light source, the ratio of the light source intensity to be tested to the standard light source intensity is defined as the glare source position weighting function Q(t, h) (as shown in Table 8).

TABLE 8

Glare source position weighting function Q(t, h)

| Q(t, h) | | | | | | | | | h | | | | | | | | |
|---|---|---|---|---|---|---|---|---|---|---|---|---|---|---|---|---|---|
| t | 0 | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 |
| | 0 | 1 | 1.26 | 1.53 | 1.9 | 2.35 | 2.86 | 3.6 | 4.2 | 5 | 6 | 7 | 8.1 | 9.25 | 10.4 | 11.7 | 13.2 |
| | 0.1 | 1.05 | 1.22 | 1.46 | 1.8 | 2.2 | 2.75 | 3.4 | 4.1 | 4.8 | 5.8 | 6.8 | 8 | 9.1 | 10.3 | 11.6 | 13 |
| | 0.2 | 1.12 | 1.3 | 1.5 | 1.8 | 2.2 | 2.66 | 3.18 | 3.88 | 4.6 | 5.5 | 6.5 | 7.6 | 8.75 | 9.85 | 11.2 | 12.7 |
| | 0.3 | 1.22 | 1.38 | 1.6 | 1.87 | 2.25 | 2.7 | 3.25 | 3.9 | 4.6 | 5.45 | 6.45 | 7.4 | 8.4 | 9.5 | 10.9 | 12.1 |
| | 0.4 | 1.32 | 1.47 | 1.7 | 1.96 | 2.35 | 2.8 | 3.3 | 3.9 | 4.6 | 5.4 | 6.4 | 7.3 | 8.3 | 9.4 | 10.6 | 11.9 |
| | 0.5 | 1.43 | 1.6 | 1.82 | 2.1 | 2.48 | 2.91 | 3.4 | 3.98 | 4.7 | 5.5 | 6.4 | 7.3 | 8.3 | 9.4 | 10.5 | 11.8 |

TABLE 8-continued

Glare source position weighting function Q(t, h)

| Q(t, h) | | | | | | | | h | | | | | | | | | |
|---|---|---|---|---|---|---|---|---|---|---|---|---|---|---|---|---|---|
| 0.6 | 1.55 | 1.72 | 1.98 | 2.3 | 2.66 | 3.1 | 3.6 | 4.1 | 4.8 | 5.6 | 6.4 | 7.35 | 8.4 | 9.4 | 10.6 | 11.7 |
| 0.7 | 1.7 | 1.88 | 2.12 | 2.48 | 2.87 | 3.3 | 3.78 | 4.3 | 4.88 | 5.76 | 6.6 | 7.4 | 8.5 | 9.6 | 10.5 | 11.7 |
| 0.8 | 1.82 | 2 | 2.32 | 2.7 | 3.08 | 3.5 | 3.92 | 4.6 | 5.1 | 6 | 7 | 7.5 | 8.6 | 9.5 | 10.8 | 11.8 |
| 0.9 | 1.96 | 2.2 | 2.54 | 2.9 | 3.3 | 3.7 | 4.2 | 4.75 | 5.3 | 6 | 6.75 | 7.7 | 8.7 | 9.66 | 10.8 | 11.8 |
| 1 | 2.11 | 2.4 | 2.76 | 3.1 | 3.5 | 3.91 | 4.4 | 5 | 5.6 | 6.2 | 7 | 7.9 | 8.8 | 9.75 | 10.8 | 11.9 |
| 1.1 | 2.3 | 2.6 | 2.92 | 3.3 | 3.72 | 4.2 | 4.7 | 5.25 | 5.8 | 6.65 | 7.2 | 8.15 | 9 | 9.9 | 11 | 12 |
| 1.2 | 2.4 | 2.75 | 3.12 | 3.5 | 3.9 | 4.36 | 4.85 | 5.5 | 6.05 | 6.7 | 7.8 | 8.3 | 9.2 | 10 | 11 | 12.1 |
| 1.3 | 2.55 | 2.9 | 3.3 | 3.7 | 4.2 | 4.66 | 5.2 | 5.7 | 6.3 | 7 | 7.7 | 8.56 | 9.36 | 10.2 | 11.2 | 12.3 |
| 1.4 | 2.7 | 3.1 | 3.6 | 3.9 | 4.36 | 4.86 | 5.35 | 5.85 | 6.5 | 7.26 | 8 | 8.7 | 9.6 | 10.4 | 11.4 | 12.4 |
| 1.5 | 2.85 | 3.15 | 3.65 | 4.1 | 4.55 | 5 | 5.5 | 6.2 | 6.8 | 7.5 | 8.2 | 8.85 | 9.7 | 10.6 | 11.5 | 12.5 |
| 1.6 | 2.96 | 3.4 | 3.8 | 4.25 | 4.75 | 5.2 | 5.75 | 6.3 | 7 | 7.65 | 8.4 | 9 | 9.8 | 10.8 | 11.8 | 12.6 |
| 1.7 | 3.1 | 3.56 | 4 | 4.5 | 4.9 | 5.4 | 5.95 | 6.6 | 7.2 | 7.8 | 8.5 | 9.2 | 10 | 10.9 | 11.9 | 12.8 |
| 1.8 | 3.26 | 3.7 | 4.2 | 4.66 | 5.1 | 5.6 | 6.1 | 6.76 | 7.4 | 8 | 8.65 | 9.36 | 10.1 | 11 | 11.9 | 12.8 |
| 1.9 | 3.43 | 3.86 | 4.3 | 4.75 | 5.2 | 5.7 | 6.3 | 6.9 | 7.5 | 8.17 | 8.8 | 9.5 | 10.2 | 11 | 12 | 12.8 |
| 2 | 3.6 | 4 | 4.56 | 4.9 | 5.35 | 5.8 | 6.4 | 7.1 | 7.7 | 8.5 | 8.9 | 9.6 | 10.4 | 11.1 | 12 | 12.9 |
| 2.1 | 3.6 | 4.17 | 4.65 | 5.05 | 5.5 | 6 | 6.6 | 7.2 | 7.82 | 8.46 | 9 | 9.76 | 10.6 | 11.2 | 12.1 | 12.9 |
| 2.2 | 3.76 | 4.25 | 4.72 | 5.2 | 5.6 | 6.1 | 6.7 | 7.36 | 8 | 8.55 | 9.16 | 9.85 | 10.6 | 11.3 | 12.1 | 12.9 |
| 2.3 | 3.85 | 4.35 | 4.8 | 5.25 | 5.7 | 6.22 | 6.8 | 7.4 | 8.1 | 8.65 | 9.3 | 9.9 | 10.7 | 11.4 | 12.2 | 13 |
| 2.4 | 3.96 | 4.4 | 4.9 | 5.36 | 5.8 | 6.3 | 6.9 | 7.5 | 8.2 | 8.8 | 9.4 | 10 | 10.8 | 11.5 | 12.3 | 13 |
| 2.5 | 4 | 4.5 | 4.95 | 5.4 | 5.85 | 6.4 | 6.95 | 7.55 | 8.25 | 8.85 | 9.5 | 10.1 | 10.9 | 11.6 | 12.3 | 13 |

Based on the fact that the major image is taken by a single camera lens, no geometric or triangle relation is used to calculate the light source distance. According to the evaluation, the image capturing results in the range of 5 m±3 m are used to calculate sNGA, and the error may still be acceptable. Hence, suppose that an image is inversely-projected onto a plane with a distance d'=5 m; according to this inverse projection geometry, the original coordinates on the T axis, H axis, and R axis may be reversely deduced. Accordingly, the projection coordinates (t', h') are respectively projected onto the plane of the sensor coordinates (x, y) in object space, which are the horizontal and vertical coordinate values (t', h') of the inverse projection corresponding to each pixel on the plane at d'=5 m. The pixel coordinates (x, y) may be obtained from a pixel array of the compressed image I2 (as shown in FIG. 25(c)).

Figure 30:
FIGS. 30 and 31 depict an image of Example 5 of the anti-glare display system of the present invention.
Figure 30:
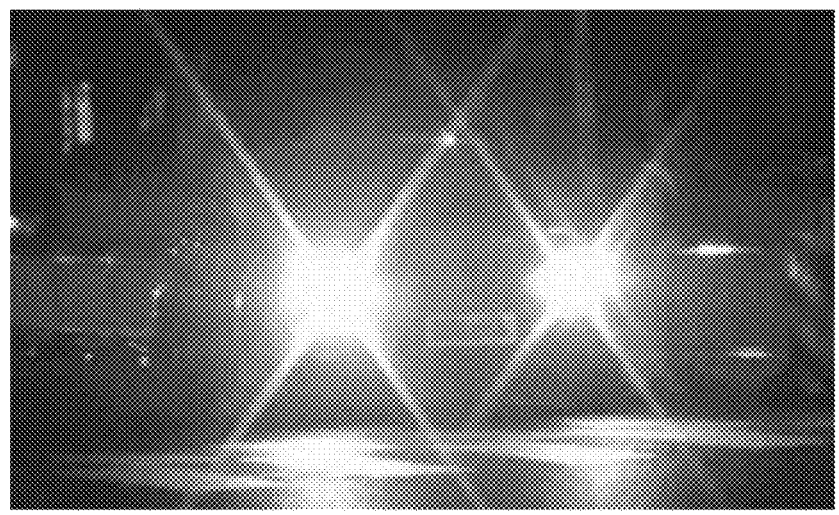

Step 1:

The camera unit 110 photographing the major image Pm (as shown in FIG. 30(a))

The Capturing Specification:

The horizontal field of view H-FOV=135°

The capturing specification is 1280×720

The YUV image format is used for color.

Figure 31:
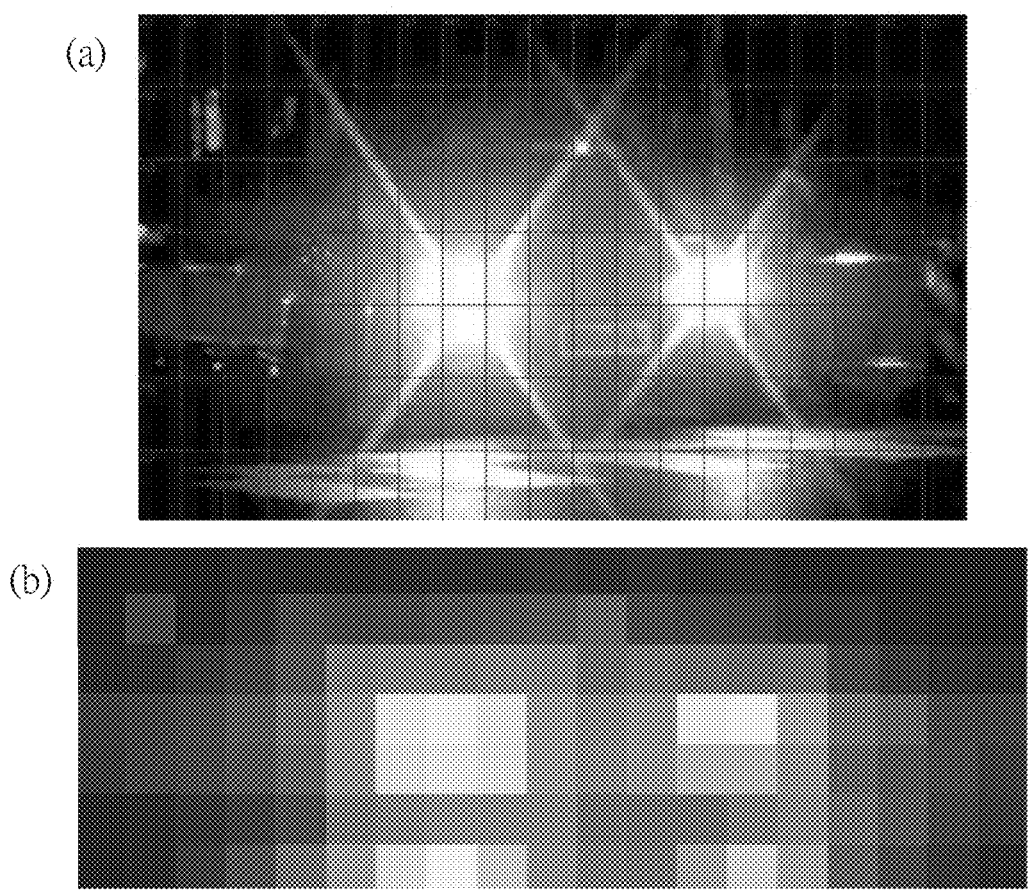

Step 2: The UV data are removed from the raw image P to obtain a gray level image (as shown in FIG. 30(b)). A pixel array with a lower resolution (19×7) is calculated. The average value is calculated according to each grid (as shown in FIG. 31(a)), and a pixel array with a lower resolution (19×7) is obtained (as shown in FIG. 31(b)); wherein the corresponding gray level brightness values may be referred to Table 9.

TABLE 9

Each pixel brightness value of the pixel array with a lower resolution
(19 × 7)

| 27 | 25 | 25 | 36 | 33 | 33 | 38 | 41 | 43 | 47 | 41 | 46 | 40 | 40 | 29 | 28 | 26 | 26 | 23 |
|---|---|---|---|---|---|---|---|---|---|---|---|---|---|---|---|---|---|---|
| 31 | 67 | 32 | 48 | 71 | 67 | 68 | 78 | 80 | 85 | 100 | 70 | 61 | 60 | 48 | 46 | 33 | 30 | 26 |
| 36 | 42 | 52 | 65 | 84 | 127 | 132 | 129 | 135 | 134 | 111 | 120 | 114 | 108 | 110 | 69 | 51 | 44 | 41 |
| 58 | 62 | 72 | 87 | 161 | 149 | 227 | 236 | 222 | 154 | 137 | 150 | 229 | 235 | 164 | 112 | 97 | 68 | 65 |
| 53 | 60 | 70 | 81 | 99 | 145 | 219 | 228 | 220 | 155 | 139 | 151 | 182 | 182 | 148 | 97 | 82 | 71 | 55 |
| 32 | 38 | 48 | 58 | 76 | 122 | 135 | 142 | 141 | 139 | 115 | 113 | 114 | 131 | 141 | 111 | 86 | 63 | 52 |
| 31 | 38 | 55 | 82 | 116 | 158 | 218 | 240 | 200 | 147 | 124 | 120 | 163 | 206 | 166 | 99 | 72 | 51 | 38 |

Example 5

The following example presents the situation of using the second threshold value to determine whether to activate the electrochromic element. The second threshold value is defined by sNGA. This example defines the second threshold value S2=sNGA 10; that is, the second threshold value is 10. If the captured image is calculated to have sNGA>10, the electrochromic element is activated. It is worth noticing that the second threshold value S2 set to sNGA 10 is based on a reference value that most observers consider to be offending to the eye through statistics. However, in actual application, an adjustment may still be made according to personal preferences.

Step 3: The following conditions are simplified based on a simplified calculation to be easily understood: The normalized camera lens has an effective focal length of 1 unit length, and an image size is defined according to this unit length. This allows the horizontal and vertical coordinates of the image pixel center point to directly correspond to the tangent function value. Moreover, suppose that the image inverse projection does not have image distortion; this makes the Jacobi projection coordinate conversion function a linear relation of 1:1.

Figure 32:
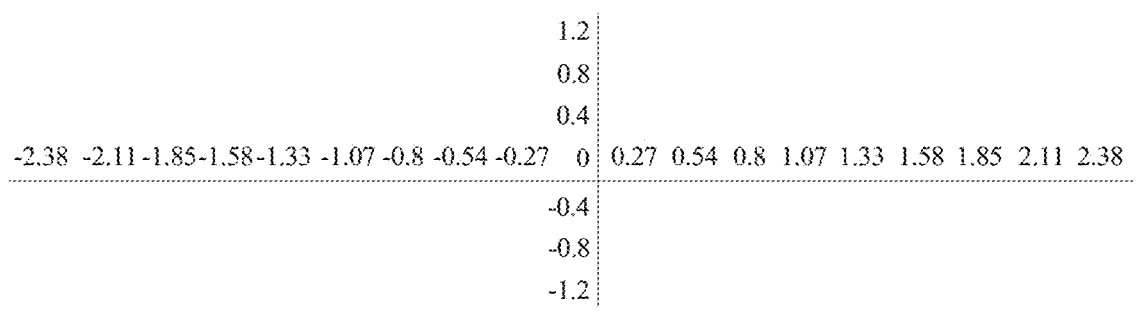
FIG. 32 depicts a pixel coordinate value schematic diagram of Example 5 of the anti-glare display system of the present invention.

Firstly, the first threshold value is set to S1=an average value+50;

then, the range of ambient light is set to ≤average+20;

according to Table 8, the average brightness is calculated as Average Pixel value=95.9;

The range of the brightness value >145.9 is defined as the glare region L for the calculation of the glare;

The range of the brightness value <115.9 is defined as the ambient light region B for the calculation of ambient light;

Hence, suppose that an image is inversely-projected onto a plane with a distance 5 m, where H_FOV is 135 degrees;
according to the capturing specification;

The effective focal length of the camera lens is 1 unit length;

The horizontal field of view H-FOV=135°;
an image width=2.49×2=4.98 unit length;
an image height=2.49×(720/1280)×2=2.8 unit length;
the major image with a lower resolution 19×7 is calculated;

the center of each pixel is aligned to the pixel coordinate value on the projection plane (as shown in FIG. 32).

Since the basis for the calculation of sNGA is the projection relation of the light source to the sensor (as shown in FIGS. 28 and 29), the inverse projection relation of each pixel has to be calculated. Based on the fact that the major image is taken by a single camera lens, no geometric or triangle relation is used to calculate the light source distance. According to the evaluation, the image capturing results in the range of 5 m±3 m are used to calculate sNGA, and the error may still be acceptable.

The image distance is calculated with the use of δx·δy, which therefore is a constant because the image does not have the supposition of distortion. In addition, a reduced fraction is performed; based on the same supposition, the Jacobi projection coordinate conversion function is a linear relation of 1:1. Hence, the image calculation is simplified to take the tangent function value corresponding to the pixel coordinates.

TABLE 10

Part of examples for the calculation of $Q(t, h)^2 \times (1 + t^2 + h^2)$

| | | | | | | | | | | |
|---|---|---|---|---|---|---|---|---|---|---|
| 0 | 0 | 0.27 | 0.54 | 0.8 | 1.07 | 1.33 | 1.58 | 1.85 | 2.11 | 2.38 |
| 0 | 1 | 2.2 | 6.3 | 18 | 55.2 | 126.8 | 261.5 | 558.5 | 934.5 | 1606.3 |
| 0.4 | 35.4 | 30.9 | 62.4 | 162 | 414.9 | 959 | 1807.3 | 3232.2 | 5177.3 | 7626.5 |
| 0.8 | 1025 | 767.9 | 978 | 1542.5 | 3036.5 | 5599.9 | 9730.8 | 15622.4 | 23016.4 | 32731.9 |
| 1.2 | 17863 | 13178.5 | 13235.9 | 16847.9 | 22952.2 | 33401.1 | 34198.8 | 62296.7 | 87022.5 | 109513 |

TABLE 11

Part of examples for the calculation of $(1 + t^2 + h^2)^{3/2}$

| | | | | | | | | | | |
|---|---|---|---|---|---|---|---|---|---|---|
| 0 | 0 | 0.27 | 0.54 | 0.8 | 1.07 | 1.33 | 1.58 | 1.85 | 2.11 | 2.38 |
| 0 | 1 | 1.115 | 1.473 | 2.1 | 3.148 | 4.616 | 6.545 | 9.314 | 12.736 | 17.216 |
| 0.4 | 1.249 | 1.373 | 1.754 | 2.415 | 3.506 | 5.021 | 6.999 | 9.824 | 13.301 | 17.839 |
| 0.8 | 2.1 | 2.246 | 2.69 | 3.443 | 4.655 | 6.303 | 8.420 | 11.405 | 15.042 | 19.753 |
| 1.2 | 3.811 | 3.989 | 4.521 | 5.405 | 6.795 | 8.644 | 10.976 | 14.209 | 18.1 | 23.083 |

According to Equation (1), the sNGA value=14.64 of this image is calculated. Since the value is greater than the second threshold value, the electrochromic element is activated to reduce the amount of glare reflection from the rear-view mirror.

$$sNGA = 8 \cdot \log\left[\frac{1}{4} \cdot \frac{\sum_{i,j \in L} V_L(i, j)^2 \cdot Tab_L(i, j)}{\sum_{l,m \in B} V_B(l, m) \cdot Tab_B(l, m)}\right] = 14.64 > sNGA\ 10$$

In another embodiment, an image capturing system is provided, including the anti-glare display system as mentioned above. Wherein image capturing system may be applied to various fields related to an electronic portable device, an electronic wearable device, an electronic monitoring device, an electronic information device, an electronic communication device, a machine vision device, or a vehicle electronic device.

The above description is merely illustrative rather than restrictive. Any spirit and scope without departing from the present invention as to equivalent modifications or alterations is intended to be included in the following claims.

What is claimed is:

1. An anti-glare display system, comprising:
at least one camera unit disposed on a moving device, at least disposed on a rear side of the moving device, and photographing a major image in a direction opposite to a moving direction;
a processing unit electrically connected to the at least one camera unit to receive the major image and dividing the major image to obtain at least one sub-image;
at least one display unit comprising an electrochromic element and electrically connected to the processing unit to receive and display the sub-image from the processing unit; and
a microcontroller electrically connected to the processing unit and the at least one display unit;
wherein when the processing unit determines that a glare value of the sub-image is larger than a threshold value, the processing unit controls the microcontroller to adjust the electrochromic element of the display unit displaying the sub-image with the glare value being greater than the threshold value so as to adjust a degree of discoloration of the electrochromic element
wherein the camera unit comprises:
an optical image sensor receiving a light from the rear side of the moving device; and
a lens assembly positioned in front of the optical image sensor, and an optical axis of the lens assembly overlapping a central normal line of a sensing surface of the optical image sensor in such a way that the light focuses on the optical image sensor;
wherein the lens assembly comprises five, six, seven, eight, nine, or ten lenses having refractive power, and each of the lenses is arranged sequentially from an object side to an image side; the lens assembly satisfies the following condition:

0.1≤InTL/HOS≤0.95;

wherein, HOS is a distance from an object side surface of a lens farthest from an image plane to a sensing surface of the optical image sensor on an optical axis; InTL is a distance from an object side surface of a lens furthest from the image plane to a lens closest to the image plane on an optical axis.

2. The anti-glare display system according to claim 1, wherein the processing unit determines ambient light intensity by the major image and determines glare light source intensity by the sub-image, and the glare value is a ratio of the glare light source intensity and the ambient light intensity.

3. The anti-glare display system according to claim 1, wherein the display unit further comprises:
a transflective layer disposed between a transparent substrate of the electrochromic element and a transparent conductive layer to be used as a transflective mirror.

4. The anti-glare display system according to claim 3, wherein the transflective layer has a transmittance between 1% and 99%.

5. The anti-glare display system according to claim 3, wherein the transflective layer has a reflectance between 1% and 99%.

6. The anti-glare display system according to claim 3, wherein the display unit further comprises:
a planar display device disposed in front of the transflective mirror along the moving direction and displaying the sub-image;
wherein the transflective mirror closely attaches the planar display device.

7. The anti-glare display system according to claim 1, wherein the camera unit has a horizontal field of view at least larger than 45 degrees.

8. The anti-glare display system according to claim 1, wherein the camera unit has a horizontal field of view between 45 degrees and 230 degrees.

9. The anti-glare display system according to claim 1, wherein the processing unit calibrates the glare value with a calibration value, and the calibration value corresponds to a physiological reference value of a user of the moving device.

10. An image-capturing system, comprising the anti-glare display system according to claim 1, wherein the image-capturing system is applied to an electronic portable device, an electronic wearable device, an electronic monitoring device, an electronic information device, an electronic communication device, a machine vision device, or a vehicle electronic device.

* * * * *